US009424535B2

(12) United States Patent
Whiting

(10) Patent No.: US 9,424,535 B2
(45) Date of Patent: Aug. 23, 2016

(54) SYSTEMS AND METHODS FOR MANAGING STAGING AND CHOREOGRAPHY

(76) Inventor: Jeffrey V. Whiting, New York, NY (US)

(*) Notice: Subject to any disclaimer, the term of this patent is extended or adjusted under 35 U.S.C. 154(b) by 1142 days.

(21) Appl. No.: 13/114,974

(22) Filed: May 24, 2011

(65) Prior Publication Data

US 2011/0296332 A1 Dec. 1, 2011

Related U.S. Application Data

(60) Provisional application No. 61/348,112, filed on May 25, 2010.

(51) Int. Cl.
*G06Q 10/00* (2012.01)
*G11B 27/30* (2006.01)

(52) U.S. Cl.
CPC ............ *G06Q 10/00* (2013.01); *G11B 27/3027* (2013.01)

(58) Field of Classification Search
CPC ..... G06F 8/34; G06F 3/0481; G05B 19/0426; G06Q 10/00; G11B 27/3027
USPC .................... 715/771; 434/247, 250
See application file for complete search history.

(56) References Cited

U.S. PATENT DOCUMENTS

| 5,179,656 | A | * | 1/1993 | Lisle | 715/836 |
| 2006/0008779 | A1 | * | 1/2006 | Shand et al. | 434/90 |
| 2006/0245599 | A1 | * | 11/2006 | Regnier | 381/79 |
| 2007/0040836 | A1 | * | 2/2007 | Schickler | 345/473 |
| 2010/0306701 | A1 | * | 12/2010 | Glen | 715/810 |

OTHER PUBLICATIONS

Virtual Magic Sheet 1.2, Eric Cornwell, West Side Systems, Oct. 9, 2006.*

* cited by examiner

*Primary Examiner* — Li Sun
(74) *Attorney, Agent, or Firm* — Kory D. Christensen; Stoel Rives LLP

(57) ABSTRACT

Systems and methods for managing choreography in a simple and efficient manner are disclosed. The disclosed systems and methods allow a user, such as a choreographer, director, or producer, to document the movement of each performer in a performance or other choreography. Choreography of each performer can be documented in as much detail as desired and coordinated with a beat of music, a timeline of a dialog, and/or the movements of other performers. The disclosed systems and methods provide for creation of precise spacing charts. The documentation and charts can be linked or otherwise associated together and/or linked or otherwise associated with a section of a script of the performance.

23 Claims, 18 Drawing Sheets

SYSTEMS AND METHODS FOR MANAGING STAGING AND CHOREOGRAPHY

RELATED APPLICATIONS

This application claims the benefit under 35 U.S.C. §119 (e) of U.S. Provisional Patent Application No. 61/348,112, filed May 25, 2010, and entitled SYSTEM AND METHOD FOR MANAGING STAGING AND CHOREOGRAPHY, which is hereby incorporated by reference herein in its entirety.

COPYRIGHT NOTICE

©2011 Open Jar Productions. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

The present disclosure relates to staging and choreography, and in particular, to systems and methods for documenting and managing staging and choreography.

BRIEF DESCRIPTION OF THE DRAWINGS

The present disclosure may best be understood by reference to the following description taken in conjunction with the accompanying figures, in which like parts are referred to by like numerals:

FIGS. 13A and 13B are embodiments of staging staffs for documenting choreography, according to the present disclosure.

DETAILED DESCRIPTION

Figure 1:
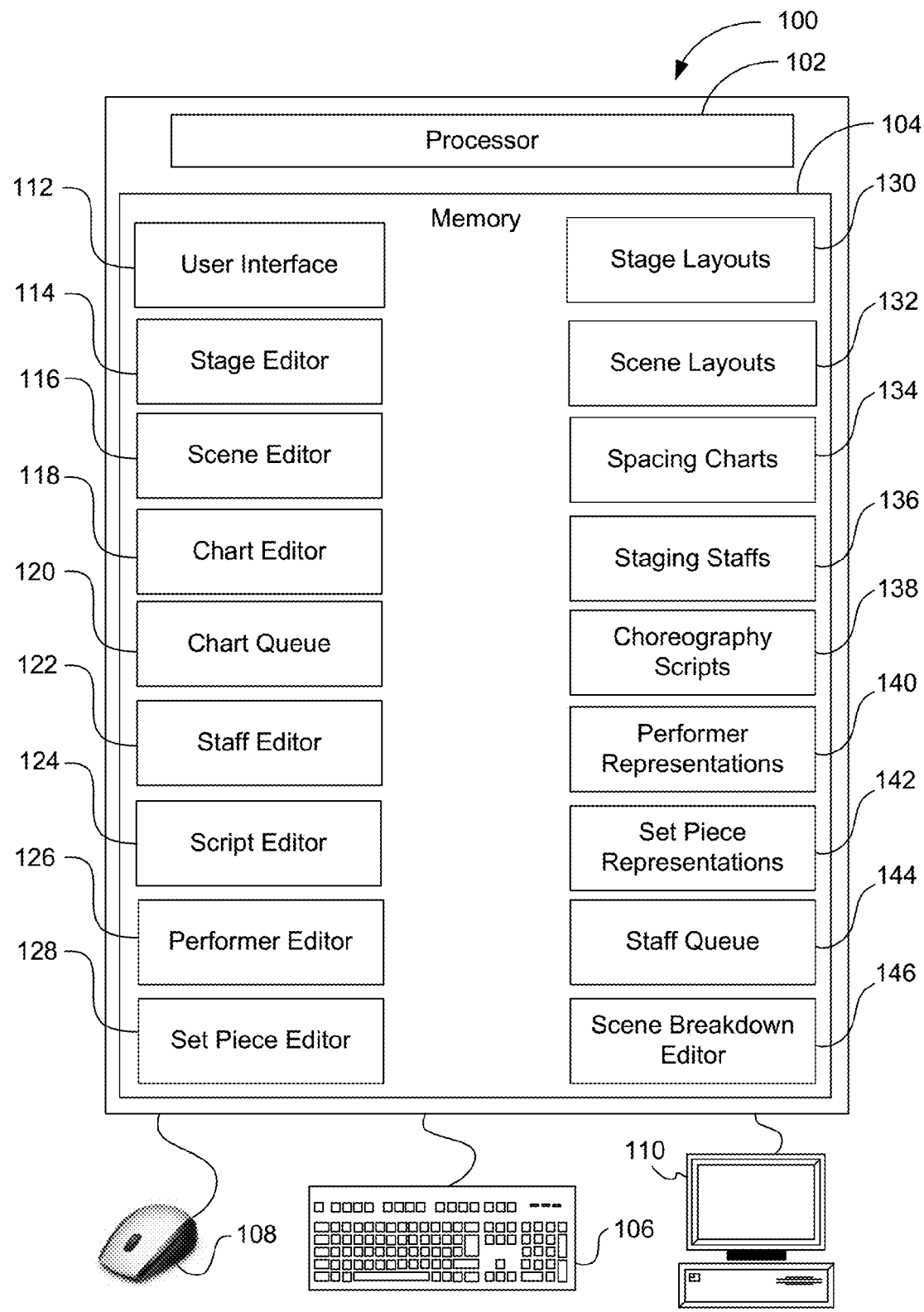
FIG. 1 is a system for managing choreography, according to one embodiment.

Performances of performing arts, such as drama and dance, often involve sophisticated and complex choreography and other movement of performers and/or staging. Documenting the movement of performers in a performance can be challenging and burdensome, particularly when the performance is a major production, such as a Broadway play or musical or a Hollywood production. The varied possible movements of a performer, and combinations and sequences of movements, do not lend themselves to easy or uniform description. At any given time, a performer may be moving arms, legs, head, etc. When many performers and set pieces are involved, the documentation process is further complicated.

For simple performances, documentation may be less essential. A choreographer may be able to simply memorize or otherwise remember the various positions and sequences of movements of the performers throughout the performance, or otherwise document the positions and movement sequences with rudimentary drawings and description. The performance may be simple enough that the performers can also learn and memorize all the positions and movement sequences of most or all participating performers. However, the details of the choreography of the performance may fade with the memory of the choreographer and performers. Without documentation of the choreography, accurate and precise reproduction of the performance at a later time may be impossible. Much culture, heritage, and custom has been lost as traditional dances and other performances of various cultures have slowly been forgotten over time due to lack of use.

Complex productions, such as Broadway plays and musicals and Hollywood productions, generally may be too lengthy and complex for a single person to memorize. Remembering the positions and movements of multiple performers at any given point in a production is typically too challenging for even the most capable choreographer or director. Also, when the production involves multiple acts and/or multiple scenes, all of which may be rehearsed separately and potentially out of order, the individual performers may have great difficulty remembering their individual choreography and movements as they learn and rehearse the performance. Without documentation, it is challenging for a choreographer or director to provide assistance.

Techniques that have been developed and used to document choreography include written documentation (e.g., drawings, descriptions, choreography notations, etc.), photography, video and film. Video and film are most widely used because of the ease with which they can be reproduced and distributed to performers for learning positions and movements. However, the typical two-dimensional nature of photography, video, and film tends to flatten the captured scene, which results in a loss of depth. As a result, the depth of a performer's position during choreography can be difficult to ascertain from photography, video and film. Also, camera angles or distance away from the performers may unintentionally obscure parts of the positions and movements of the performers or otherwise fail to fully capture the positions and movements in a useful manner. Photography, video and film are of little use to choreographers or producers, who are still left to memorize movements and positions of multiple performers at various points in time during the production. Photography, video, and film are also time consuming to use during rehearsals. Moreover, taking photos and video documentation is forbidden by the actor's unions, thereby making written documentation the only 'permitted' type of documentation. Thus, written documentation generally may be used as a primary documentation method for choreographers and producers during rehearsals.

Written documentation methods that are currently available are imprecise and extremely time consuming to use. In a Broadway production, a "show bible" that attempts to document the choreography of the production during each period of the production generally consists of a large binder filled with hand-drawn spacing charts. The spacing charts may or may not include description. When a description is provided, it, too, is usually provided in hand-written notes. Additional description of the choreography may be written in prose, again, in hand-written notes on or adjacent the spacing chart. Hand-drawn spacing charts are imprecise and inconsistent because there is no presently available means to easily generate consistent and precise spacing charts. In particular, determining a precise location on the stage from a hand-drawn spacing chart can be difficult.

Present choreography notation forms are not adequate alternatives. The present choreography notation forms are convoluted and tedious, such that very few people know and understand how to use them. These notation forms are generally so complicated and unintuitive that they require a certification to use, which results in a lack of qualified people to both create the notations and to reconstruct a performance from the notations. Accurately documenting a performance with these choreography notation forms can be time intensive and expensive.

The present disclosure is directed to systems and methods for managing choreography in a simple and efficient manner. The disclosed systems and methods may include, or be implemented by, a computing device. The systems and methods allow a user, such as a choreographer, stage manager, director, or producer, to document the movement of each performer in a performance or other choreography. Many of the tedious and time-consuming aspects of documenting choreography can be automated. Choreography of each performer can be documented in as much detail as desired and coordinated with a beat of music, a timeline of a dialogue, and/or the movements of other performers. The disclosed systems also facilitate creation of precise spacing charts. The documentation and charts can be linked or otherwise associated together, and/or linked or otherwise associated with a section of a script of the performance.

Although the term choreography literally means "dance-writing," and is generally understood to involve music, application of the disclosed systems and methods is not limited to dance or sequences of movements set to music. The term "choreography," as used herein, includes any sequence of movements and the design or planning of such sequence of movements, such as in, but not limited to, theater, dance, gymnastics, ice skating, marching band, show choir, cinematography, cheerleading, fashion shows, synchronized swimming, and other performing arts. The term choreography, as used herein, encompasses performances, including major productions. The term choreography, as used herein, also encompasses both traditional choreography (movements and dance set to music) and staging (movements of characters, set pieces, and the like, not set to music) of performances.

The disclosed subject matter may be described herein in terms of various functional components and processing steps. A skilled artisan will appreciate that such components and steps may be implemented as any number of hardware or software components or combination thereof configured to perform the specified functions. For example, an exemplary embodiment may employ various graphical user interfaces, software components, and database functionality.

For the sake of brevity, conventional techniques for computing, data entry, data storage, networking, speech recognition, and/or the like may not be described in detail herein. Furthermore, the connecting lines shown in various figures contained herein are intended to represent exemplary functional relationships and/or communicative, logical, and/or physical couplings between various elements. A skilled artisan will appreciate, however, that many alternative or additional functional relationships or physical connections may be present in a practical implementation of a system or method for managing choreography.

FIG. 1 illustrates a system 100 for managing choreography, according to one embodiment. The system 100 may include a processor 102, a memory 104, one or more input devices, such as a keyboard 106 and mouse 108, and a display 110 or other output device. The system 100 may be embodied in any suitable computing device, such as a personal computer, laptop computer, tablet computer, handheld device, or smart phone. Additional or alternative input devices may include, but are not limited to, a touch screen device, a microphone, a camera, and a digital pen.

The system 100 may further include a user interface 112, a stage editor 114, a scene editor 116, a chart editor 118, a chart queue 120, a staff editor 122, a script editor 124, a performer editor 126, a set piece editor 128, stage layouts 130, scene layouts 132, spacing charts 134, staging staffs 136, choreography scripts 138, performer representations 140, set piece representations 142, a staff queue 144, and/or a scene breakdown editor 146.

The user interface 112 may present information and other output to a user and receive input from a user. The user interface 112 may be a graphical user interface ("GUI") that is displayed on the display 110. The user interface 112 may display, or otherwise coordinate with the stage editor 114, the scene editor 116, the chart editor 118, the chart queue 120, the staff editor 122, and/or other elements of the system to facilitate creation and editing of a stage layout 130, a scene layout 132, a spacing chart 134, a staging staff 136, a choreography script 138, performer representations 140, and/or set piece representations 142. The user interface 112 may display, for example, a stage layout 130, a scene layout 132, a spacing chart 134, a staging staff 136, a choreography script 138, a performer representation 140, and/or a set piece representation 142 in a "what-you-see-is-what-you-get" ("WYSIWYG") manner as a user of the system 100 creates and/or edits these elements to document choreography. Various embodiments of a user interface 112 are shown in FIGS. 4-16 and are discussed in greater detail below with reference to the same. The user interface 112, or portions thereof, may be stored as a module in the memory 104, as depicted in FIG. 1. In other embodiments the user interface 112 may also comprise any of a number of hardware and/or software elements, including but not limited to input devices 106, 108 and output device 110.

The stage editor 114 receives one or more stage dimensions as input and may automatically generate a stage layout 130 that represents a stage having the received one or more stage dimensions. The one or more stage dimension inputs may include a width dimension specifying how wide the stage is in terms of a unit of measurement, such as feet or meters. The stage layout 130 that is generated by the stage editor 114 may include a numberline that designates a stage centerline and locations along the width of the stage in terms of a distance from the centerline. For example, in theater productions, positions on the stage are customarily referenced in terms of a position 'stage left' (from the perspective of the performers) or a position 'stage right' from the centerline. Accordingly, the numberline of the stage layout may designate locations 'stage left' or 'stage right' along the width of the stage. The stage editor 114 may create the numberline as a grid, which may also designate locations along a depth of the stage. The locations along the depth of the stage may be referenced in terms of a distance 'up stage' from the front of the stage, a distance 'down stage' from the back of the stage, or a distance up stage or down stage from a horizontal line, a marking, or other reference on the stage.

Figure 4:
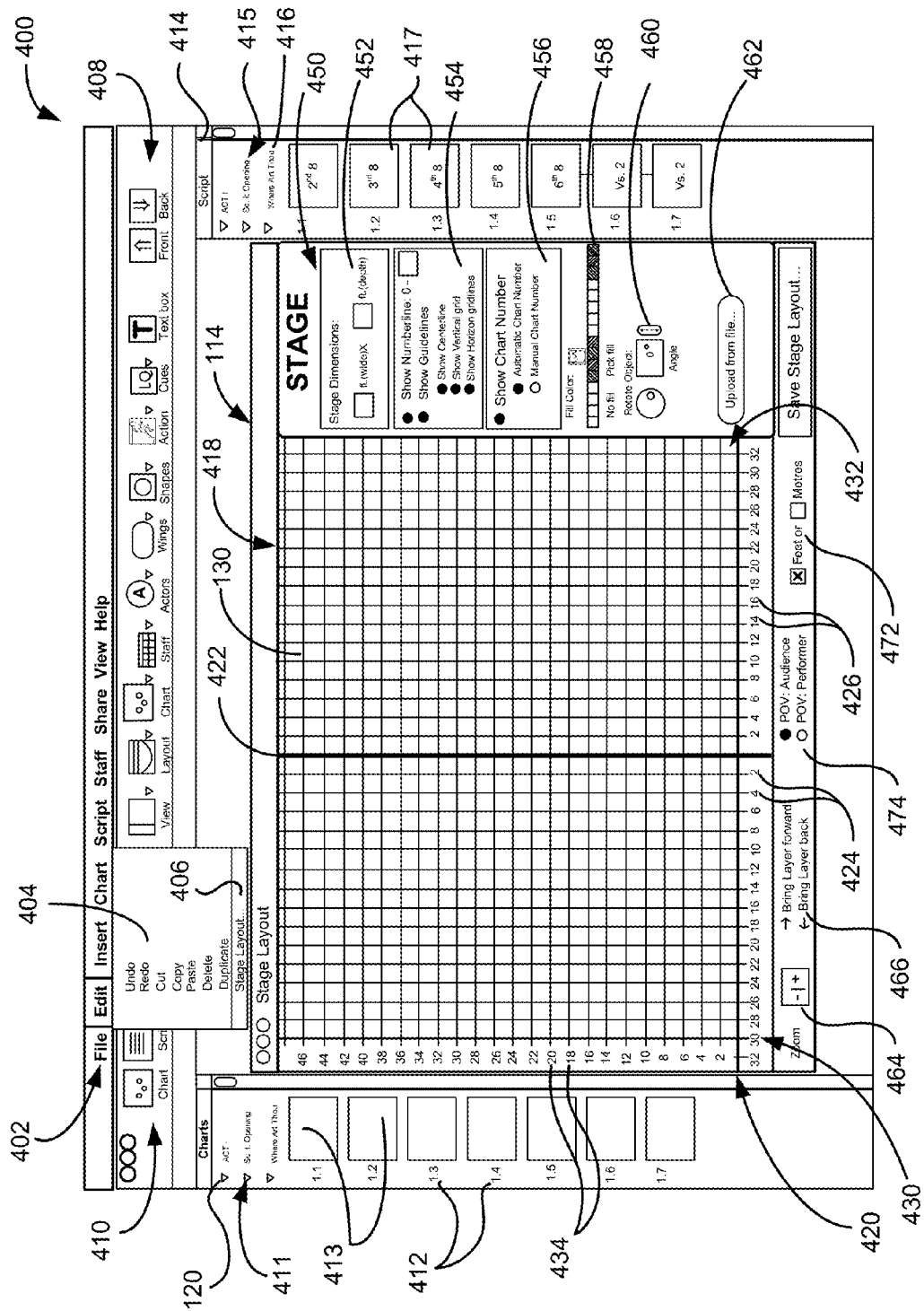
FIG. 4 is a graphical depiction of a user interface of a system for managing choreography presenting a stage layout, according to one embodiment.

The stage editor 114 may also enable positioning of elements on the stage that persist throughout the choreography. For example, if the set of a theatrical performance includes (as a set piece) a table that remains positioned in the same location during the entire duration of the performance, a set piece representation 142 of the table can be positioned in the stage layout 130 for that theatrical performance. A stage layout 130 for given choreography can be automatically applied to the scene layouts 132 and spacing charts 134 of the given choreography, enabling efficient scene layout 132 and spacing chart 134 creation. Multiple stage layouts 130 may be associated with choreography, and the stage editor 114 may enable association of a stage layout 130 with appropriate time periods of the choreography. One embodiment of a stage editor 114 is shown in FIG. 4 and is described below with reference to the same. The stage editor 114 may be stored as a module in the memory 104, as depicted in FIG. 1. In other embodiments the stage editor 114 may comprise any of a number of hardware and/or software elements.

Figure 5:
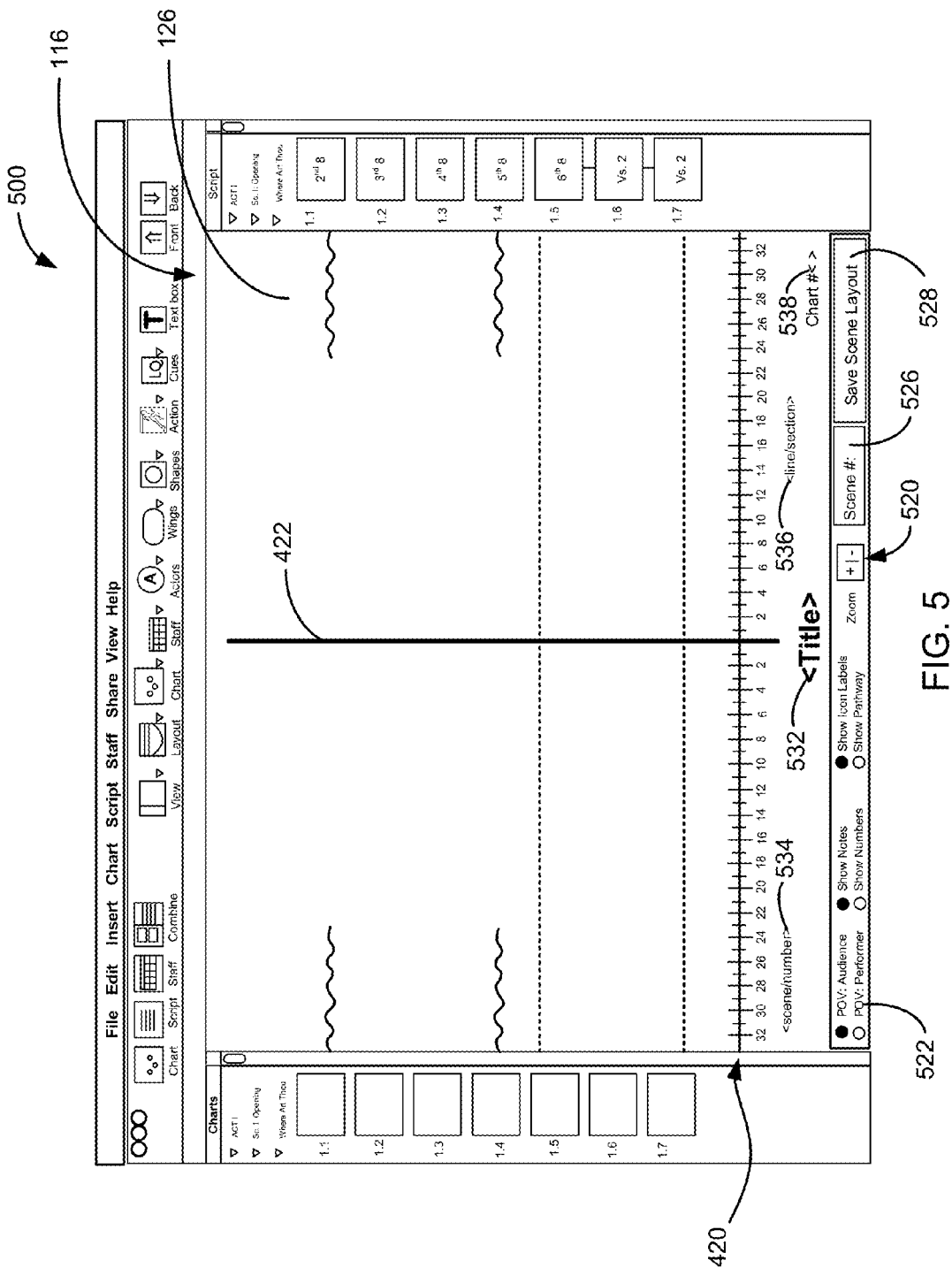
FIG. 5 is a graphical depiction of a user interface presenting a scene layout, according to one embodiment.

The scene editor 116 may enable creation and/or editing of a scene layout 132. The scene layout 132 may correspond to a scene of choreography, such as a scene of an act of a theatrical performance. The scene editor 116 may automatically apply or incorporate a stage layout 130 of the choreography. The scene editor 116 may allow selection of a stage layout 130 to be applied to the scene layout 132 being created or edited. The scene editor 116 may allow a user to diagram the layout of a given scene in a scene layout 132. For example set piece representations 142 may be positioned in the scene layout 132 as they may be positioned during the scene. The scene editor 116 may provide tools for positioning set piece representations 142 in the scene layout 132. The scene may include one or more time periods of the choreography and the scene editor 116 may enable associating the scene layout 132 to the corresponding time periods of the choreography. For example, the scene editor 116 may allow designation of the act and scene for a given scene layout 132. The scene editor 116 may also enable selection of a section of a script of the choreography and associate the scene layout 132 with the selected section of the script. The scene layout 132 may be automatically applied to or incorporated into spacing charts 134 corresponding to each time period of the scene, thereby enabling efficient creation of spacing charts 134. One embodiment of a scene editor 116 is shown in FIG. 5 and is described below with reference to the same. The scene editor 116 may be stored as a module in the memory 104, as depicted in FIG. 1. In other embodiments the scene editor 116 may comprise any of a number of hardware and/or software elements.

The chart editor 118 may enable creation and editing of a spacing chart 134 for a time period of choreography. The chart editor 118 may automatically apply or incorporate a stage layout 130 and/or a scene layout 132. A spacing chart 134 may correspond to a time period of the choreography, such as a number of counts of a scene of choreography, and the chart editor 118 may enable association of the spacing chart 134 and the time period of the choreography. For example, the chart editor 118 may enable designating a spacing chart 134 as being associated with, for example a number of counts of a song in the scene (e.g., second eight counts of the first verse). Alternatively, or in addition, the spacing chart 134 may be associated with a section of a choreography script 138.

The chart editor 118 may receive input designating a position of a performer on the stage. The position of the performer may be for a given point in time during the time period of the choreography with which the spacing chart 134 is associated. The chart editor 118 may display a performer representation 140 at the designated position on the representation of the stage of the stage layout 130. Similarly, the chart editor 118 may receive input designating a position of a set piece and display a set piece representation 142 at the designated position.

The chart editor 118 may display a real-time view of creation or editing of the chart in a WYSIWYG presentation, allowing a user to visualize exactly how the chart might appear, for example, when printed on a piece of paper and inserted into a show bible. A WYSIWYG presentation of the spacing chart 134 may allow a user (e.g., a choreographer, director, producer, etc.) to use and view the spacing chart 134 directly from a computing device. The chart editor 118 may store the created or edited spacing chart 134, including storing the stage layout 130, the performer representation 140, and the position of the performer representation 140. One embodiment of a chart editor 118 is shown in FIGS. 8-11 and described below with reference to the same. The chart editor 118 may be stored as a module in the memory 104, as depicted in FIG. 1. In other embodiments the chart editor 118 may comprise any of a number of hardware and/or software elements.

The chart queue 120 organizes the spacing charts 134 created by the chart editor 118 based on the respective time periods associated with each spacing chart 134. Accordingly, the spacing charts 134 associated with, for example, Act 1 of a theatrical performance would be ordered relative to (i.e., before) the spacing charts 134 of Act 2, etc. Similarly, within each act of the performance, the spacing charts 134 associated with, for example, Scene 1, would be ordered relative to (i.e., before) the spacing charts 134 of Scene 2, etc. Similarly, the charts of each scene would be ordered according to the respective time periods represented by, or associated with, the spacing charts 134 of the scene. The chart queue 120 may also present a navigation interface that may enable simple navigation of the various spacing charts 134 that document a piece of choreography. The chart editor 118 may be displaying a presently selected chart of the plurality of charts and the chart queue 120 may display a representation of each of the plurality of charts. A user selection of a representation of a given chart from the chart queue 120 may result in the chart editor 118 displaying the represented spacing chart 134 as the presently selected chart. One embodiment of a chart queue 120 is shown in FIG. 4 and described below with reference to the same. The chart queue 120 may be stored as a module in the memory 104, as depicted in FIG. 1. In other embodiments the chart queue 120 may include any of a number of hardware and/or software elements.

Figure 14:
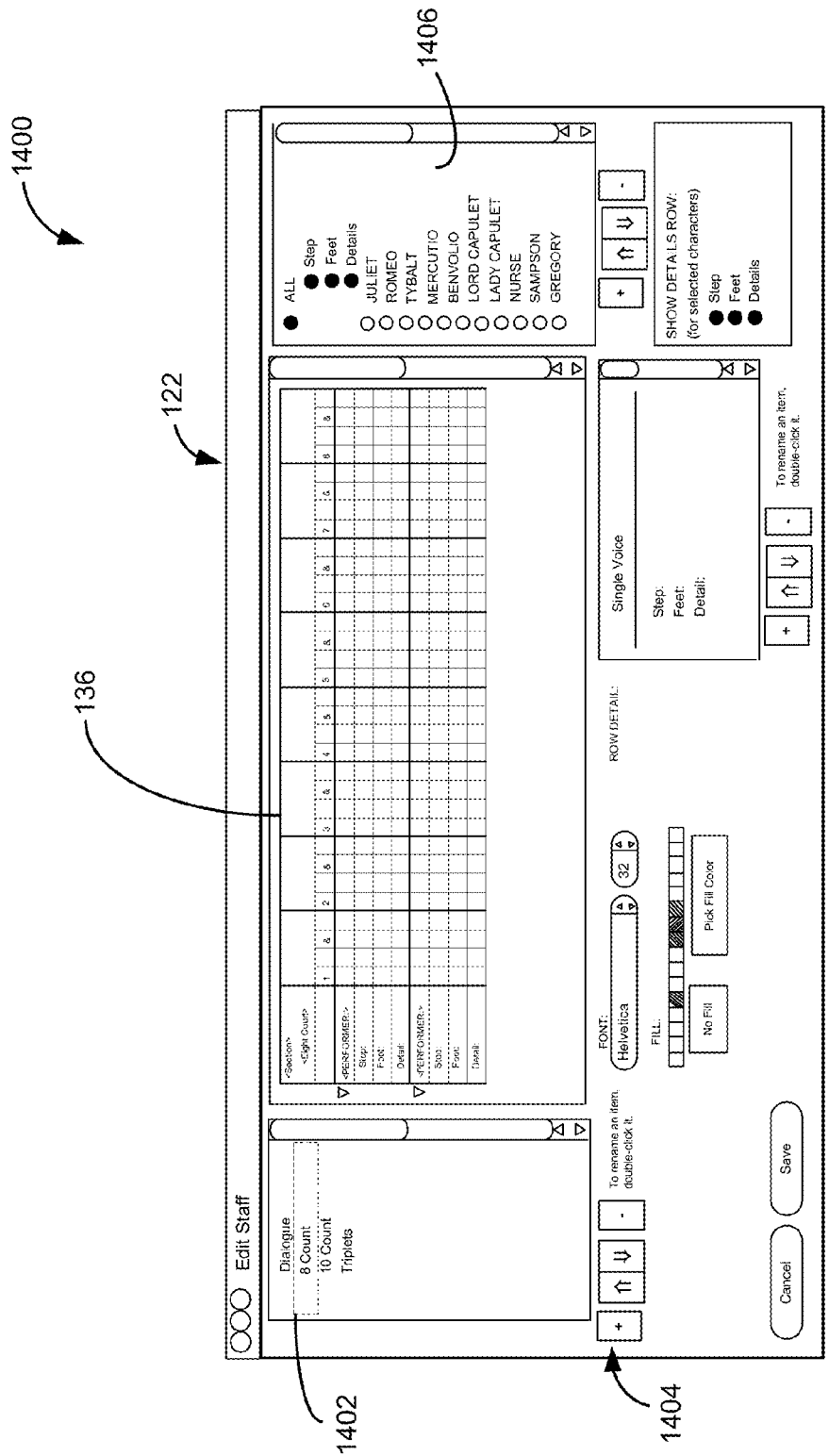
FIG. 14 is a graphical depiction of a user interface displaying a staging staff, according to one embodiment.
Figure 15:
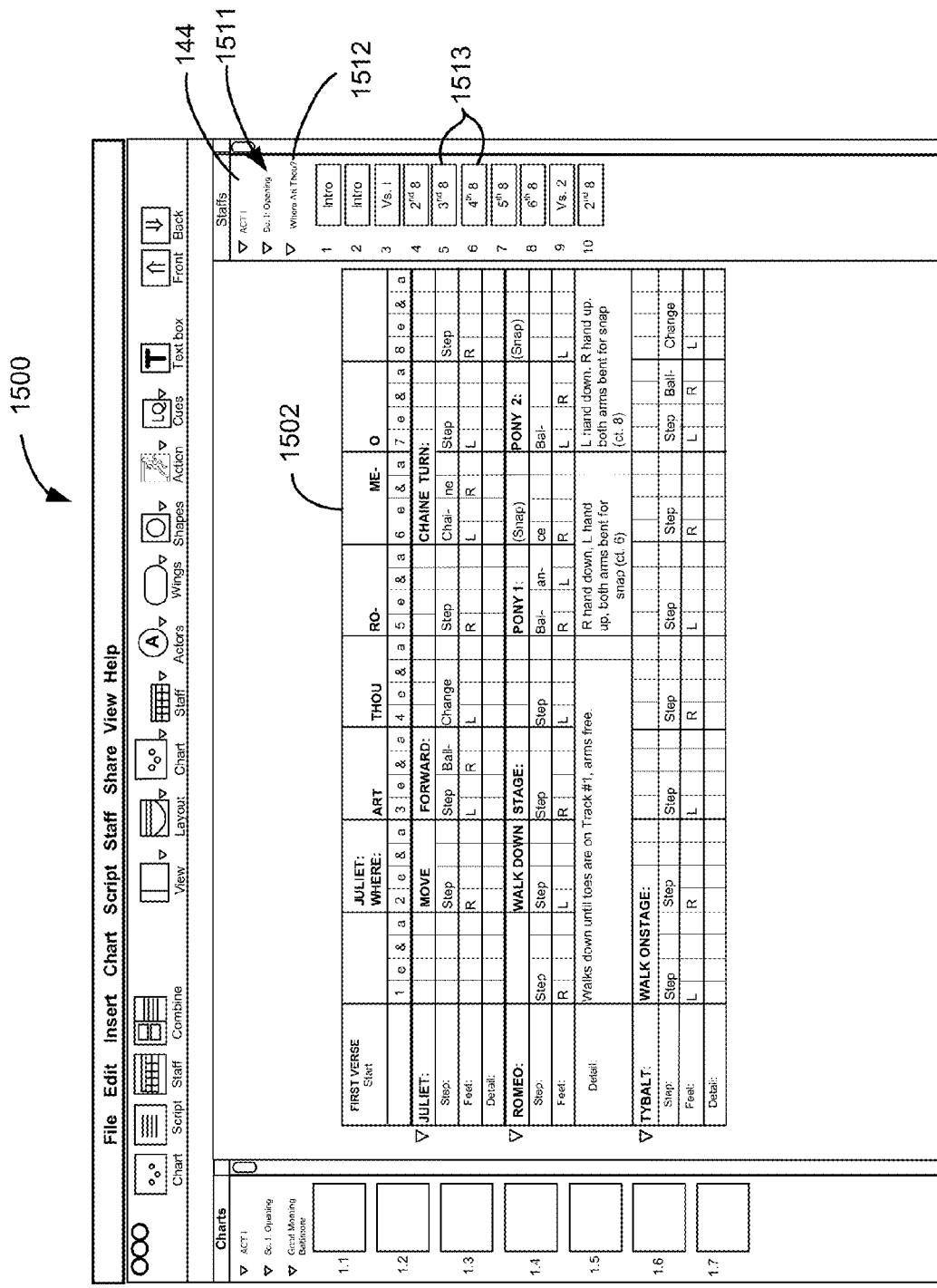
FIG. 15 is a graphical depiction of a user interface displaying staging staffs for a given time period of choreography, according to one embodiment.

The staff editor 122 may enable creation and editing of a staging staff 136 for a time period of choreography. A staging staff 136 allows documentation of movement for each performer in choreography in as much detail as desired while simultaneously documenting how the movement coordinates to the timing or flow of the performance, such as a beat of the music or a time line of a dialogue. Examples of staging staffs 136 are shown in FIGS. 13A, 13B, and 14-16 and are described in greater detail below with reference to the same. The staff editor 122 may allow selection of a duration of the staging staff 136, for example eight counts or ten counts. The staff editor 122 may create a staging staff 136 with the selected duration and appropriately divide the staging staff 136 into counts and sub-counts. The staff editor 122 may receive input to associate the staging staff 136 with a time period of the choreography. The input may include user-provided designation of a section of a script. The staff editor 122 may auto-check that the designated time period of choreography has a duration that matches the selected duration of the created or edited staging staff 136. Embodiments of a staff editor 122 are shown in FIGS. 14 and 15 and are described below with reference to the same. The staff editor 122 may be stored as a module in the memory 104, as depicted in FIG. 1. In other embodiments the staff editor 122 may include any of a number of hardware and/or software elements.

The staff queue 144 may organize the staging staffs 136 based on the respective time periods associated with each staging staff 136. Accordingly, the staging staffs 136 associated with, for example, Act 1 of a theatrical performance would be ordered relative to (i.e., before) the staging staffs 136 of Act 2, etc. Similarly, within each act of a performance, the staging staffs 136 associated with, for example, Scene 1, would be ordered relative to (i.e., before) the staging staffs 136 of Scene 2, etc. Similarly, the staging staffs 136 of each scene would be ordered according to the respective time periods represented by, or associated with, the staging staffs 136 of the scene. The staff queue 144 may also present a navigation interface that may enable simple navigation of the various staging staffs 136 that document a piece of choreography. The staff editor 122 may be displaying a presently selected staff of the plurality of staging staffs and the staff queue 144 may display a representation of each of the plurality of staffs. A user selection of a representation of a particular staff from the staff queue 144 may result in the staff editor 122 displaying the particular staff as the presently selected staff. One embodiment of a staff queue 144 is shown in FIG. 15 and is described below with reference to the same. The staff queue 144 may be stored as a module in the memory 104, as depicted in FIG. 1. In other embodiments the staff queue 144 may include any of a number of hardware and/or software elements.

Figure 6:
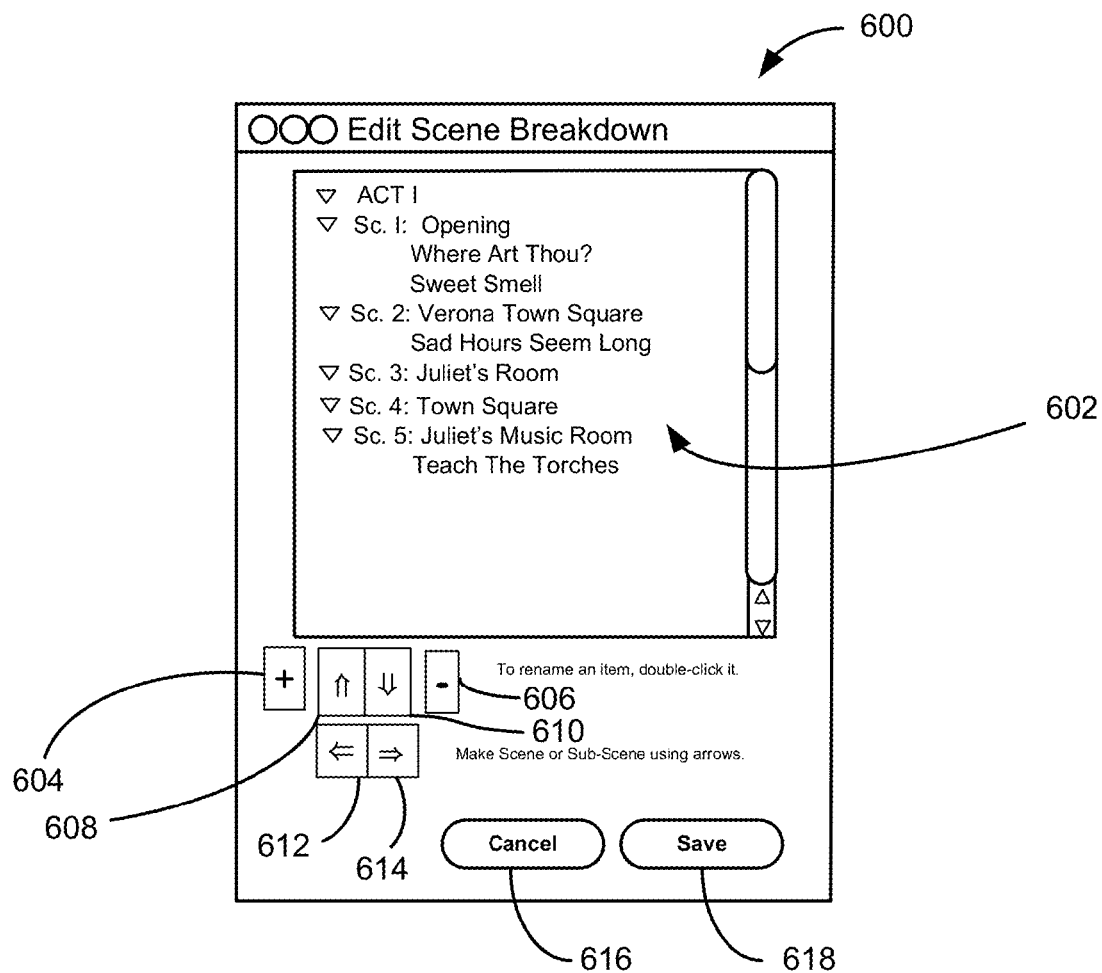
FIG. 6 is a graphical depiction of a user interface of a scene breakdown editor, according to one embodiment.

The scene breakdown editor 146 may enable a creation and/or editing of a scene breakdown (or similar breakdown) of choreography. In the case of a theatrical performance, the breakdown may include acts, scenes, and the like. One embodiment of a scene breakdown editor is shown in FIG. 6 and is described below with reference to the same. The scene breakdown editor 146 may include a user interface, may be stored as a module in the memory 104, and/or may include any of a number of hardware and/or software elements.

Figure 7:
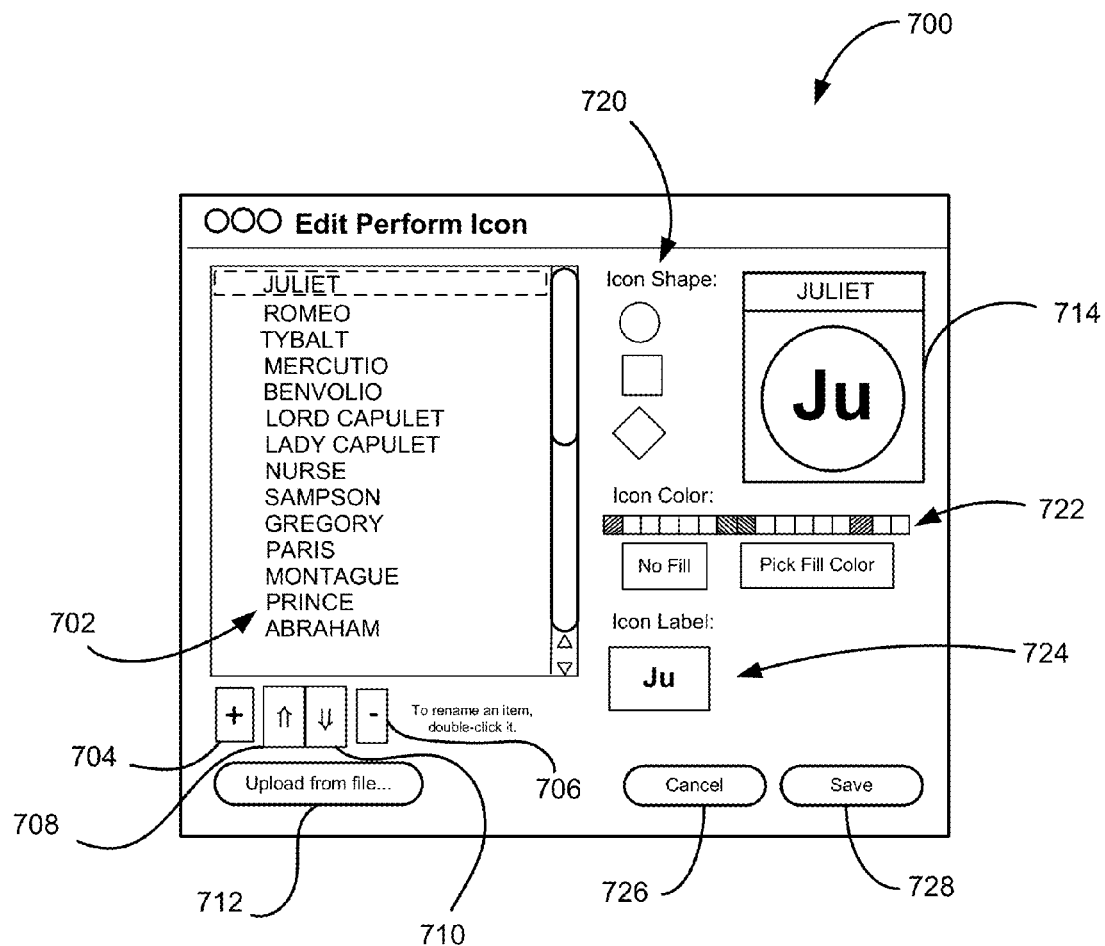
FIG. 7 is a graphical depiction of a user interface receiving input to create and edit a representation of a performer, according to one embodiment.

The system 100 for managing choreography and/or the user interface 112 may further include other tools and elements for creating and editing performer representations 140 and set piece representations 142. For example, a performer representation editor 126 is shown in FIG. 7 and is described below with reference to the same. A set piece representation editor 128 may also be provided. These tools may include user interfaces, may be stored as modules in the memory 104, or may include any of a number of hardware and/or software elements.

The stage layouts 130, scene layouts 132, spacing charts 134, staging staffs 136, choreography scripts 138, performer representations 140, and set piece representations 142 may be stored in memory 104, as depicted in FIG. 1. These elements may be stored on a remote computer drive in a client-server implementation.

Although the various elements of the system 100 are depicted in FIG. 1 as residing on a single computing device, a person of ordinary skill will appreciate that the elements may be dispersed across multiple computing devices, such as in a client-server implementation, cloud computing implementation, or other networked computing implementation. The system 100 may also include other resources such as an operating system, file services, and databases. Any of the elements of the system depicted in FIG. 1 as residing in memory 104 (e.g., user interface 112, a stage editor 114, a scene editor 116, a chart editor 118, a chart queue 120, a staff editor 122, stage layouts 130, scene layouts 132, spacing charts 134, staging staffs 136, choreography scripts 138, performer representations 140, and set piece representations 142) may be implemented in hardware, software, or a combination thereof, and the hardware may include a general purpose computing device, special purpose computing devices, or a combination thereof.

Figure 2:
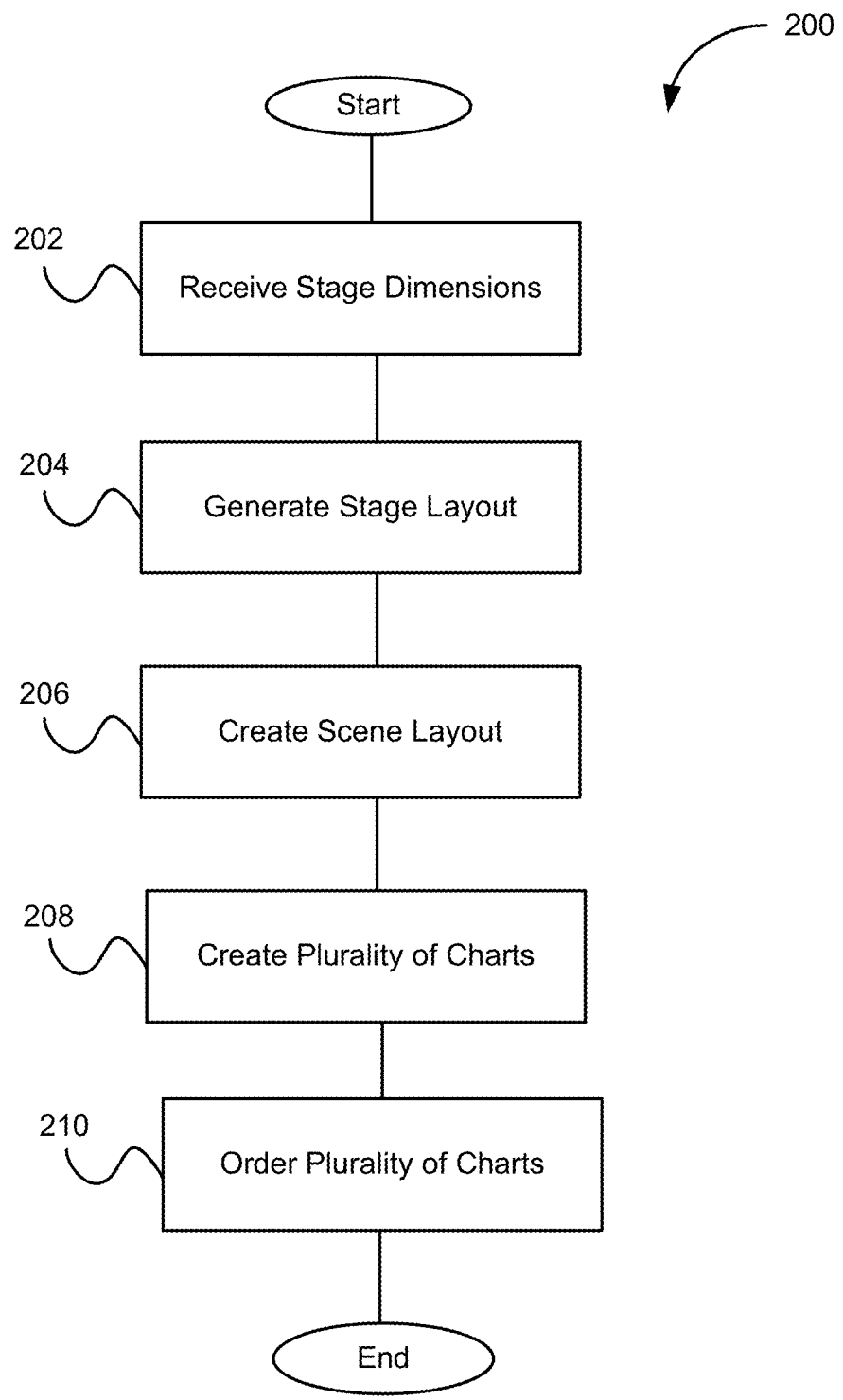
FIG. 2. is a flow diagram of a method of managing choreography, according to one embodiment.

FIG. 2. is a flow diagram of a method 200 of managing choreography, according to one embodiment. The method 200 may be implemented by a computer system or other computing device, such as the system 100 depicted in FIG. 1. One or more stage dimensions, including a width dimension, may be received 202, such as via a user input device and user interaction with a user interface or via another input mechanism (e.g., reading a configuration file). For example, the user interface 112 and/or the stage editor 114 may receive the stage dimensions.

A stage layout 130 may be automatically generated 204 based on the received stage dimensions. The stage layout 130 may be generated 204, for example automatically, by the stage editor 114. The generated 204 stage layout 130 may include a representation of a stage having the one or more received dimensions and a numberline designating locations on the stage. The locations on the stage may be designated as positions left of center or right of center from a centerline. The stage layout generation 204 may also include other aspects, such as receiving input designating set piece positioning on the stage. User interaction may provide additional information and input from which the stage layout 130 is generated 204.

A scene layout 132 is created 206, for example, by the user interface 112 and/or the scene editor 116. The creation 206 of a scene layout 132 may include automated aspects, such as automated inclusion or incorporation of the generated stage layout 130. Other aspects of scene layout creation 206 may include, for example, receiving user input regarding the layout of a scene, such as positioning of set pieces and performers and receiving input regarding one or more time periods of choreography with which the scene layout 132 is associated. User interaction may provide additional information and input from which the scene layout 132 is created 206.

A plurality of spacing charts 134 are created 208, for example by the user interface 112 and/or the chart editor 118.

The creation 208 of a spacing chart 134 may include automated aspects, such as automated inclusion of a generated 204 stage layout 130 and/or created 206 scene layout 132. Spacing chart creation 208 may involve various user interactions and inputs and is described more fully below with reference to FIGS. 3 and 8-11.

The plurality of spacing charts 134 that are created 208 may be ordered 210 according to the respective time periods of the choreography with which they are associated. Accordingly, a first spacing chart associated with a first time period of choreography and a second spacing chart associated with a second time period of choreography immediately in time after the first period of choreography may be ordered adjacent to one another with the first spacing chart ordered immediately prior to the second spacing chart. Ordering 210 of the spacing charts 134 may be automatically accomplished, for example, by the chart queue 120.

Figure 3:
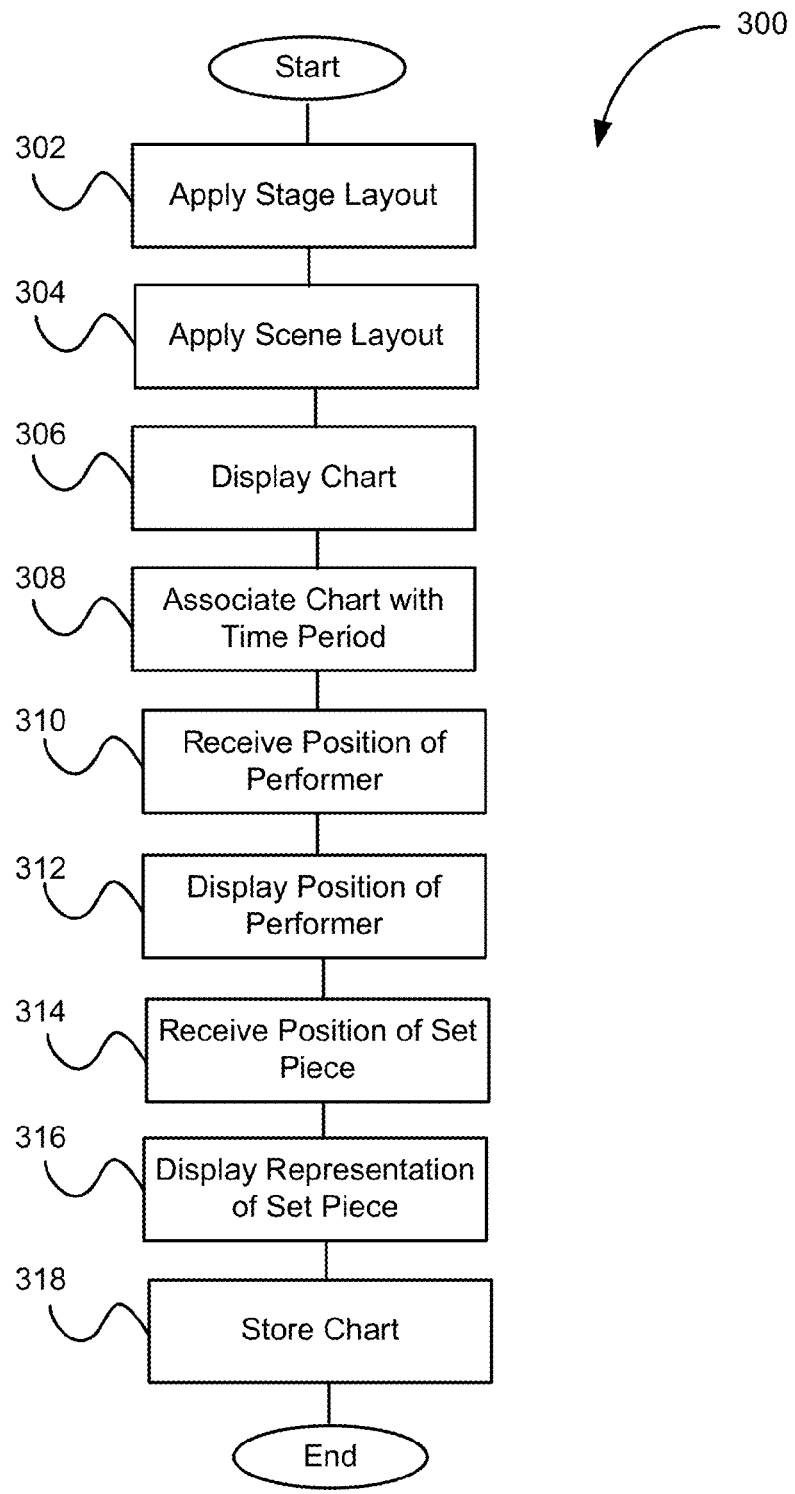
FIG. 3 is a flow diagram of a method of creating a spacing chart for managing choreography, according to one embodiment.

FIG. 3 is a flow diagram of a method 300 of creating a spacing chart 134 for documenting choreography, according to one embodiment. The method 300 may be used to create 208 (FIG. 2) a plurality of spacing charts 134 as referenced above in the description of FIG. 2. The method 300 of creating a spacing chart 134 may be implemented, for example, by the chart editor 118 of the system 100 for managing choreography depicted in FIG. 1. Creating a spacing chart 134 may include applying 302 a stage layout 130, such as the stage layout generated 204 in the method 200 of FIG. 2. Creating 208 a spacing chart 134 may also include applying 304 a scene layout 132, such as the scene layout created 206 in the method 200 of FIG. 2. The spacing chart 134 may be displayed 306 to a user for the user to visualize the stage and elements, such as set piece representations and performer representations, that may be positioned on the stage. The spacing chart 134 may be associated 308 with a time period in the choreography. The association 308 with a corresponding time period may occur automatically (e.g., the next time period of choreography without a corresponding spacing chart) or may occur based on input provided by a user.

Creating 208 a spacing chart 134 may include receiving 310 a position of a performer on the stage during the time period in the choreography corresponding to the chart and then displaying 312 a performer representation 140 at the position on the stage in the spacing chart 134. Similarly, creating a spacing chart 134 may include receiving 314 a position of a set piece on the stage during the time period in the choreography and displaying 316 a set piece representation 142 on the stage in the spacing chart 134. The chart editor 118 may facilitate receiving (e.g., via a user specifying or uploading a file) a position of a performer and/or a position of a set piece. Any number of performers and set pieces may be involved in a given time period of choreography and thus, receiving 310, 314 and displaying 312, 316 representations of performers and/or set pieces may occur a plurality of times. Finally, creating a spacing chart 134 may include storing 318 the created spacing chart 134, for example, in the memory 104 of the system 100 for managing choreography.

FIG. 4 is a graphical depiction of a user interface 400 of a system for managing choreography, according to one embodiment. The user interface 400 is depicted as presenting a stage layout 130. The user interface 400 of FIG. 4 may be a graphical user interface (GUI), as depicted, and may include a stage editor 114, which displays and also enables creation and/or editing of the stage layout 130. The graphical user interface 400 may also include menus 402, documentation tools 408, view options 410, a chart queue 120, and a script queue 414.

The stage editor 114 may automatically generate a stage layout 130 upon receiving input indicating one or more dimensions of a stage. A stage layout 130 generated by the stage editor 114 may include a stage representation 418 for a stage of the choreography that is being documented and a numberline 420 to indicate locations on the stage. The stage editor 114 may also display a stage layout 130. A user can interact with the stage editor 114 to configure and/or customize a stage layout 130 for choreography that is to be documented.

The stage editor 114 in the illustrated embodiment includes a plurality of stage layout tools 450 and configuration options, which enable a user to customize or tailor a stage layout 130. The stage layout tools 450 may include a dimension input tool 452 to receive input specifying one or more dimensions of a stage. The stage layout tools 450 may also include a numberline configuration tool 454 to designate a range of numbers on the numberline 420, whether the numberline 420 includes a grid 430 (i.e., vertical numberline), and whether certain lines or markings (e.g., centerline, gridlines) of the numberline 420 are displayed on the stage layout 130. Other stage layout tools 450 may include a chart number tool 456 to designate if and how chart numbers are displayed, a fill color tool 458 to designate a fill color, a rotate object tool 460 to change the orientation of objects positioned on the stage layout 130, an upload tool 462 to upload input (e.g., from a configuration file or other input file), a zoom tool 464 to adjust the level of zoom at which the stage layout 130 is displayed, and a layer tool 466 to adjust relative position (forward and back) of layers of the stage layout 130. The stage layout options may include a stage dimension units option 472 to allow the stage editor 114 to receive input that indicates a unit of measurement for one or more of the stage dimensions and a point of view (POV) option 474 to allow designation of the POV (or the directionality of the numberline 420) of the stage layout 130.

Although the stage layout 130 illustrated in FIG. 4 includes only the stage representation 418 and the numberline 420, a stage layout 130 may also include other elements, including but not limited to set pieces, curtains, lighting, and the like. These elements can be added to a stage layout 130 in manner similar to adding a set piece representation 142 or a performer representation 140 to a spacing chart 134, as described below in the discussion of spacing chart creation. Also, although the stage layout 130 in FIG. 4 is displayed from a birds-eye view, looking down on the stage, the stage editor 114 may also present the stage layout 130 from other perspectives. For example, the stage editor 114 may display the stage layout 130 from an audience perspective or a back stage perspective. To facilitate displaying the stage representation 418 from other perspectives, additional dimensions may be received by the stage editor 114, such as a height dimension. An audience perspective may portray a relative height of the stage and a relative height of any elements on the stage.

In the illustrated embodiment of the user interface 400, the menus 402 are familiar drop down menus. An edit menu 404 is displayed with various menu options, including a stage layout menu option 406. The stage layout menu option 406 of the edit menu 404 may be selected to open, or otherwise activate, the stage editor 114. Other menus 402 may include menu options that may also activate or open the stage editor 114. Other suitable forms of menus may be used instead of a drop down menu, such as a cascaded menu, an accordion menu, a pop-up menu, and the like.

The tools 408 of the user interface 400 may include various tools to facilitate documentation of choreography. The tools 408 may enable various actions as will be described below and/or initiate various components, such as the various editors describe above.

The user interface may also provide view options 410 to allow switching between a chart view, a script view, a staff view, or a combined view. A combined view may allow a user to view, simultaneously, for example both spacing charts 134 and corresponding staging staffs 136 or both spacing charts 134 and corresponding portions of the script 138. Examples of combined views are provided in FIGS. 12 and 16 and are discussed below with reference to the same.

As described, the chart queue 120 may order a plurality of spacing charts 134. The chart queue 120 may also provide for user navigation of the spacing charts 134. A user may navigate from a current spacing chart to another of the plurality of spacing charts 134. For example, the chart queue 120 of the depicted embodiment presents an expandable chart tree 411 that collapses larger time periods of choreography (e.g., a scene or act of a theatrical performance) down to a descriptor 412 or simple brief description (e.g., "Act 1") and that also expands to display sub-descriptors, which are descriptors of smaller time periods within a larger time period of choreography. A user may click on a descriptor in the chart tree (or an input component positioned adjacent thereto) to collapse or expand any sub-descriptors associated with a time period represented by the descriptor. In the illustrated embodiment, the smallest time period represented in the expandable chart tree 411 corresponds to the time period of a spacing chart 134. Each of the plurality of spacing charts 134 is represented by both a descriptor 412 and a chart representation 413, such as a thumbnail, icon, descriptor, and the like, to prompt a user of the content in the corresponding spacing chart. Selection of the descriptor 412 or chart representation 413 may cause the corresponding spacing chart 134 to be displayed by the chart editor 118.

The script queue 414 presents a script for the choreography, presented in chronological order. The script queue 414 may provide for navigation of the script. In the illustrated embodiment, the script queue 414 presents an expandable script tree 415 that collapses larger segments (i.e., time periods) of the script of the choreography (e.g., a scene or act of a theatrical performance) down to a descriptor 416 or simple brief description (e.g., "Act 1") and that also expands to display sub-descriptors, which are descriptors of smaller segments (i.e., time periods) within a larger segment of the script. A user may click on a descriptor in the script tree to collapse or expand any sub-descriptors associated with a segment of the script represented by the descriptor. In the illustrated embodiment, the smallest time period represented in the expandable script tree 415 corresponds to a section of script corresponding to a time period of a spacing chart 134. Other variations are possible, such as a section of script corresponding to a plurality of spacing charts or a section of script having a duration less than a time period of a spacing chart. Each of the plurality of sections of script is represented by both a descriptor 412 and a script section representation 417, such as a thumbnail, icon, descriptor, and the like, to prompt a user of the content in the section of script. Selection of the descriptor 416 or script section representation 417 may cause the corresponding section of script to be displayed in the user interface 400. The descriptors 416 in the expandable script tree 415 may correspond to descriptors 412 in the expandable chart tree 411. Accordingly, in a combined view, selection of a descriptor 412 in the expandable chart tree 411 may result in simultaneous selection of the corresponding descriptor 416 in the expandable script tree.

FIG. 5 is a graphical depiction of a user interface 500 of a system 100 for managing choreography presenting a scene layout 132, according to one embodiment. The user interface 500 of FIG. 5 may be similar in many respects to the user interface 400 of FIG. 4, except that the user interface 500 may include a scene editor 116 instead of a stage editor 114. The scene editor 116 may generate and/or display a scene layout 132 and/or enable editing of a displayed scene layout 132. The scene editor 116 may include scene tools and/or scene options to facilitate customization of the scene layout 132. For example, the scene editor 116 may include a zoom tool 520 to adjust the zoom level at which the scene layout 132 is viewed. The scene editor 116 may also include a POV option 522 to adjust the perspective or POV at which the scene layout 132 is displayed. The scene editor 116 may also include a scene number input field 526 to receive input from a user designating the scene number for the scene layout 132. A save button 528 may also be provided by the scene editor 116 for manipulation by a user to instruct the system 100 to save the current scene layout 132.

The scene layout 132 for a scene of choreography may include the stage representation 418 and the numberline 420 of the stage layout 130, as illustrated in FIG. 5. The centerline 422 is also shown. The scene editor 116 may automatically apply or incorporate into the scene layouts 132 the appropriate stage layout 130 that corresponds to an instant set of choreography documentation, thereby expediting creation of scene layouts 132. The scene editor 116 may also enable a user to designate a stage layout 130 that the scene editor 116 should apply or incorporate into a scene layout 132. Accordingly, the scene layout 132 may include all elements of the stage layout 130 that is applied or incorporated by the scene editor 116. Stated differently, the scene layout 132 may include all elements of a stage layout 130 from which the scene layout 132 is generated. As described above, the numberline 420 may comprise a grid 430 with a depth line 432, or vertical portion (see FIG. 4). However, in FIG. 5, the depth line 432 of the grid 430 of the numberline 420 simply is not displayed.

The scene layout 132 may also include various fields for displaying information about the performance, scene, and a spacing chart 134 in the scene, as shown FIG. 5. For example, a title field 532 designates a location where a title of the performance is displayed in a spacing chart of the scene. A scene/number field 534 may designate the scene or the number in the choreography. A line/section field 536 may designate a particular line from the script and/or section from the script that corresponds to the spacing chart 134. A chart number field 538 may designate the chart number, as based on the ordering of the spacing charts 134, for example by the chart queue 120. User input may be received by the scene editor 116 to designate which of these and other fields may be included in the scene layout 132. The fields may be auto-populated in a spacing chart 134 that includes or otherwise incorporates the depicted scene layout 132. Association of a spacing chart 134 with a time period of choreography and/or a section of script may provide information for auto-populating these fields.

A scene layout 132 can include other elements, beyond the elements depicted in FIG. 5, including, but not limited to, set pieces, curtains, lighting, and the like. These elements can be added to a stage layout 130 in manner similar to adding a set piece representation 142 or a performer representation 140 to a spacing chart 134, as described below in the discussion of spacing chart creation.

FIG. 6 is a graphical depiction of a user interface 600 of a scene breakdown editor 146 of system for managing choreography, according to one embodiment. The illustrated user interface 600 is presenting a scene breakdown 602. The user interface 600 may be configured to enable a user to define and label time periods of the choreography. For example, a user can define an act, a scene, a sub-scene, and the like, of a theatrical production, as illustrated in FIG. 6. The scene breakdown editor 146 may include input options for creating and editing the scene breakdown of the choreography. An add (e.g., "+") button 604 allows a user to add or define a new time period of the choreography. A remove (e.g., "−") button 606 enables removal or deletion of a previously defined time period of choreography. A move up button 608 and a move down button 610 enable reordering of the defined time periods by moving a particular time period up or down, respectively, in the breakdown 602 of time periods. A promote button 612 and a demote button 614 enable promotion and demotion of time periods, respectively, within the breakdown 602 of time periods. The promote button 612 promotes a defined time period to a higher level, to encompass one or more lower level time periods. The demote button 614 demotes of a time period to a lower level, to be encompassed by a higher level time period. A cancel button 616 cancels all changes to the breakdown 602 and a save button 618 saves all changes to the breakdown 602. Once a time period of choreography is defined, a scene layout 132 and/or spacing charts 134 may be associated with the time period.

FIG. 7 is a graphical depiction of a user interface 700 of a system for managing choreography, according to one embodiment. The user interface 700 may be a user interface of a performer representation editor. The user interface 700 is shown receiving input to create and edit a performer representation 140. A user defines one or more performer representations 140 for use in creating spacing charts 134, for example using the chart editor 118. A list 702 of defined performers may be presented in the user interface 700. An add (e.g., "+") button 704 allows a user to add or define a new performer representation 140. A remove (e.g., "−") button 706 enables removal or deletion of a previously defined performer representation 140. A move up button 708 and a move down button 710 enable reordering of the defined performer representations 140 by moving a particular performer representation 140 up or down, respectively, in the list 702 of performers. An upload from file button 712 enables uploading a performer representation 140, or performer data, to be uploaded from a file for creation of a new performer representation 140.

A user selection of a performer in the list 702 may enable the performer representation 140 for the performer to be modified. For example, in FIG. 7, "Juliet" is selected, which allows the performer representation 140 for Juliet to be edited or otherwise modified. A display pane 714 may display a WYSIWYG presentation of the appearance of the performer representation 140 of a selected performer. A shape selection tool 720 may enable a user to designate a shape of the performer representation 140. A fill selection tool 722 may enable a user to designate a color of the performer representation 140. A label tool 724 may enable a user to designate a label to appear on the performer representation 140. A cancel button 726 cancels all changes to the currently selected performer representation 140 and may close the user interface 700. A save button 728 saves all changes to the performer representation 140. A saved performer representation 140 is made available, for example in a "greenroom," to be used in a spacing chart 134, as shown in FIG. 8 and described below with reference to the same.

Figure 10:
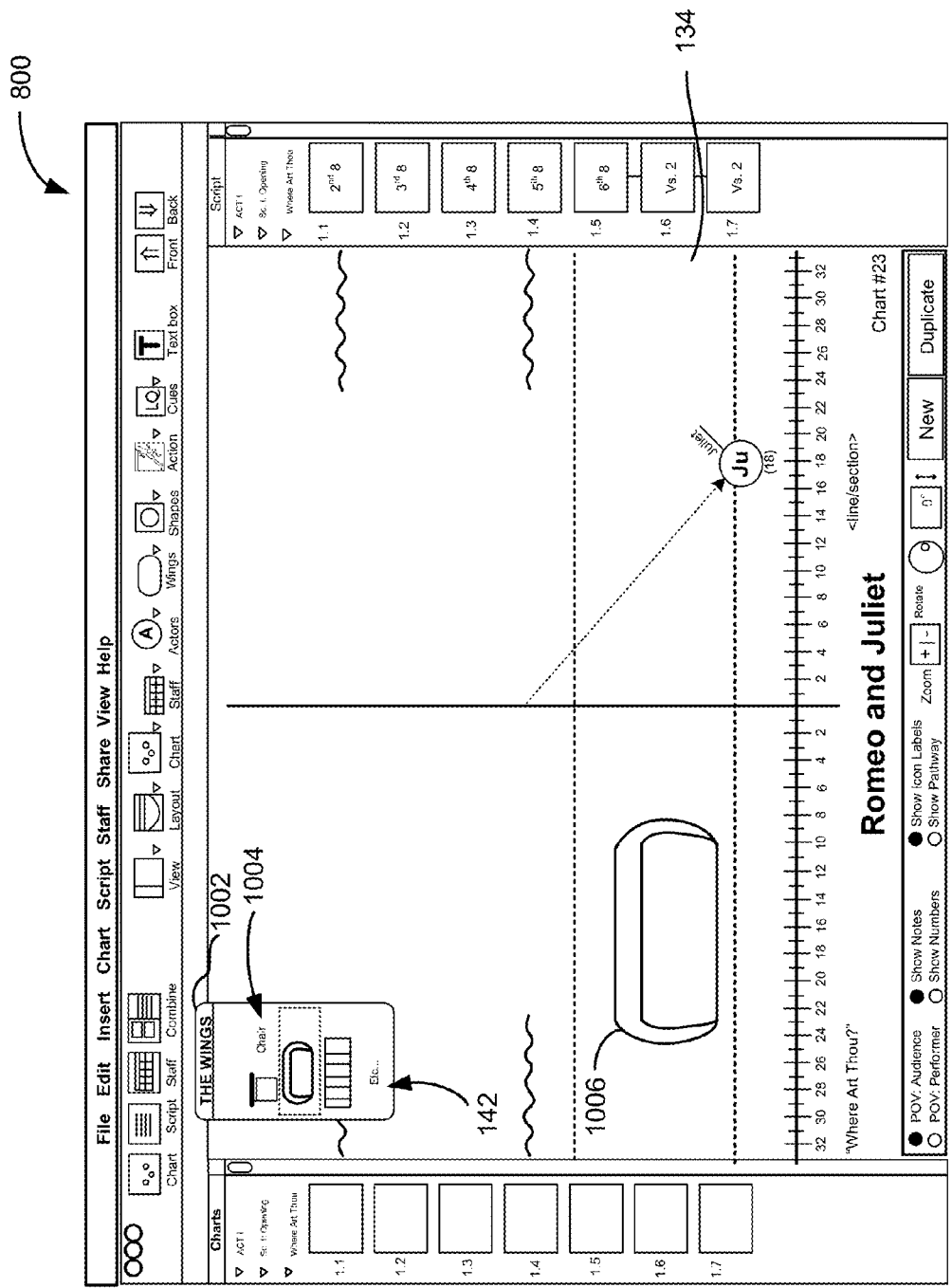
FIG. 10 is a graphical depiction of a user interface receiving input specifying a set piece representation to add to a current spacing chart, according to one embodiment.

Although not described in detail, a system for managing choreography may include a set piece representation editor having a user interface similar to the user interface 700 of the performer representation editor. The set piece representation editor may facilitate creation and/or editing of set piece representations for use in creation of spacing charts. The user interface of a set piece representation editor may include many tools and/or options that are similar to those described above with reference to the user interface for the performer representation editor. A saved set piece representation is made available, for example in "the wings," to be used in a spacing chart, as shown in FIG. 10 and described below with reference to the same.

Figure 8:
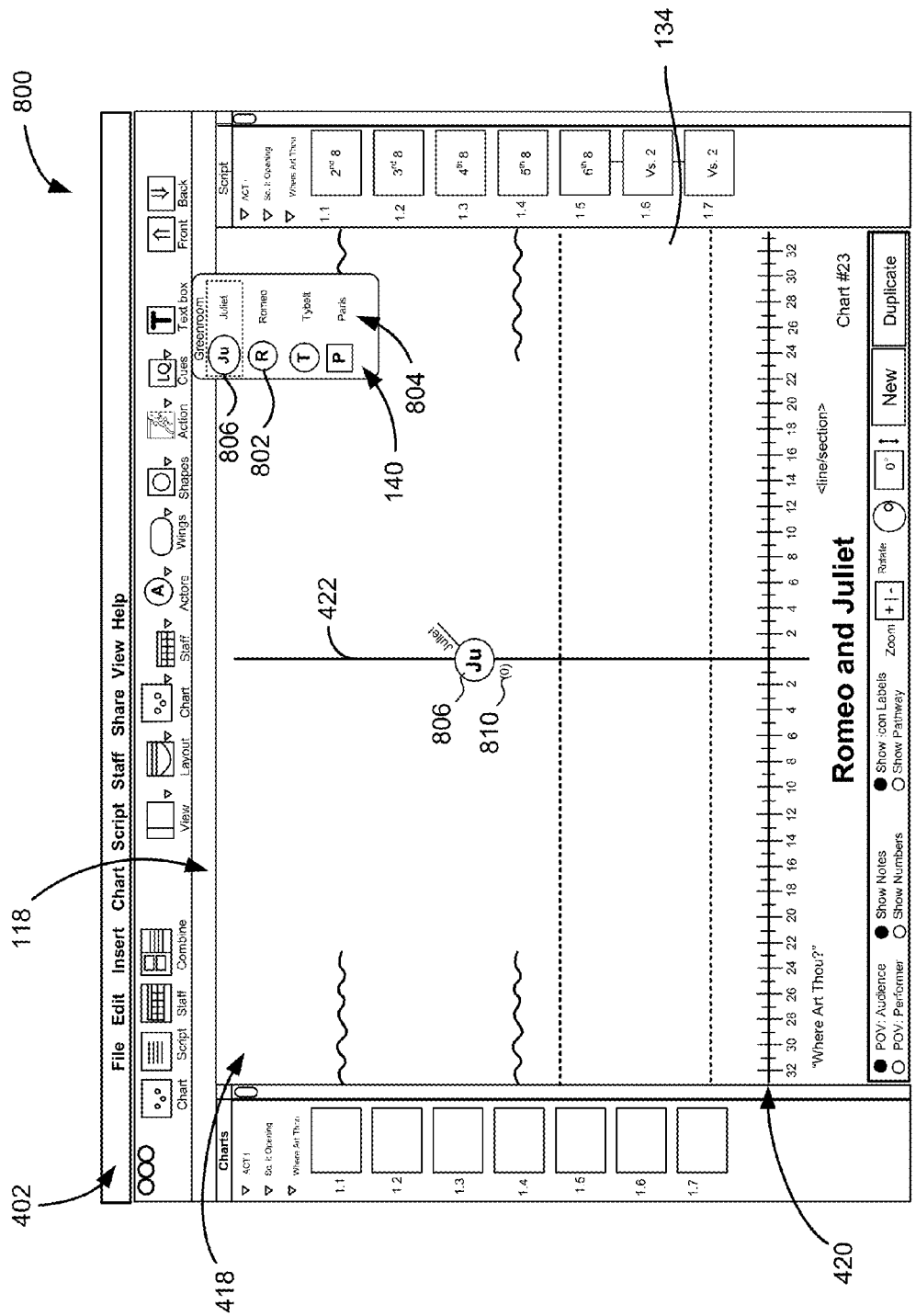
FIG. 8 is a graphical depiction of a user interface receiving input specifying a representation of a performer to add to a current spacing chart, according to one embodiment.

FIG. 8 is a graphical depiction of a user interface 800 of a system for managing choreography presenting a spacing chart 134. The user interface 800 of FIG. 8 may be similar in many respects to the user interfaces 400 and 500 of FIGS. 4 and 5, respectively, except the user interface 800 may include a chart editor 118. The chart editor 118 may generate a spacing chart 134, which may include applying or incorporating a scene layout 132 (which in turn may include applying or incorporating a stage layout 130). Accordingly, a newly generated spacing chart 134 may include the stage representation 418 and the numberline 420, including the centerline 422, of the stage layout 130 (see FIG. 3). The chart editor 118 also enables a user to create and/or edit a displayed spacing chart 134. FIG. 8 depicts how a user may interact with the chart editor 118 to add a performer representation 140 to a displayed spacing chart 134. The chart editor 118 receives input specifying a particular performer representation 140 to add to a current spacing chart 134. A menu option of one or more of the menus 402 (e.g., an insert menu) may launch a "greenroom" 802 that displays a list 804 of performers for which performer representations 140 are available to be added to the current spacing chart 134. Selection of a particular performer, such as Juliet, from the greenroom may result in a Juliet representation 806 being inserted into the current spacing chart 134.

When a performer representation 140 is added to a spacing chart 134, the chart editor 118 may automatically track the position of the performer representation 140 on the stage, based on the numberline 420. The chart editor 118 may display a position indicator 810 adjacent the performer representation 140. The position indicator 810 may provide a numerical value indicating the position of the performer representation 140 along the numberline 420. For example, in FIG. 8, the Juliet representation 806 is positioned directly on the centerline 422, which is at position "0" along the numberline 420. Accordingly, the position indicator 810 adjacent the Juliet representation 806 reads "0".

Figure 9A:
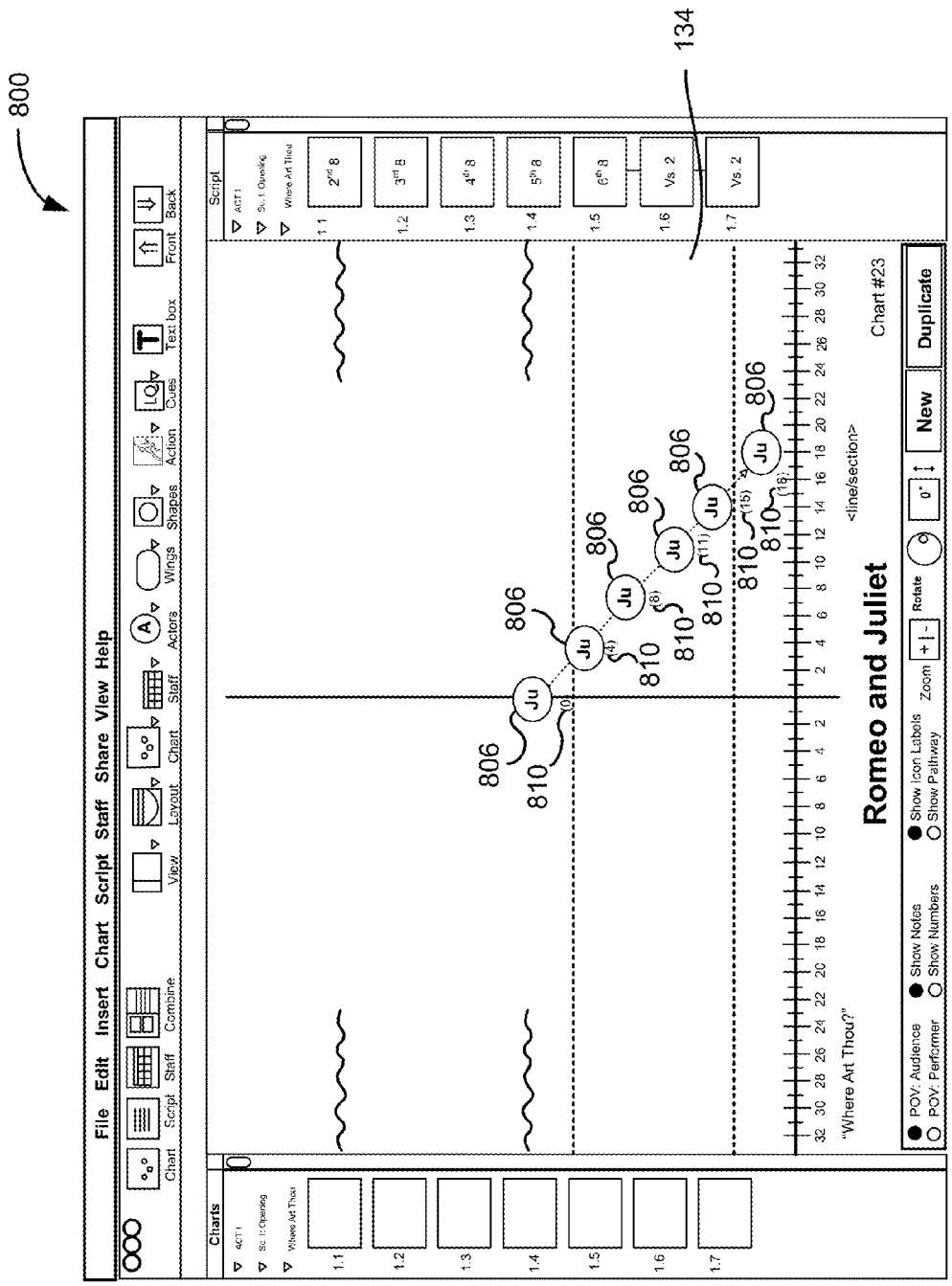
FIGS. 9A and 9B are graphical depictions of a user interface calculating and displaying an indication of a position of a performer representation on the stage.
Figure 9B:
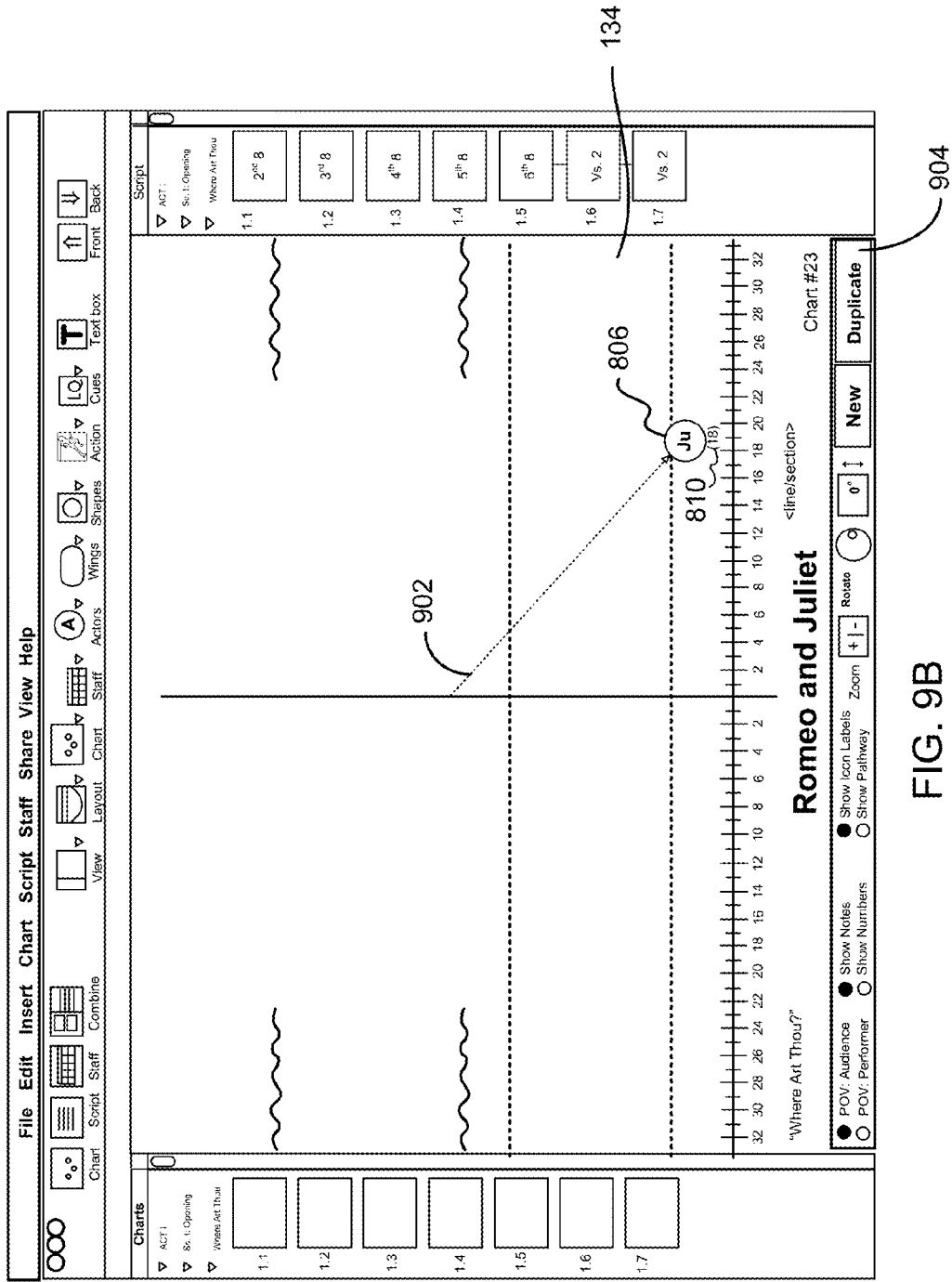

FIGS. 9A and 9B are graphical depictions of the user interface 800 of FIG. 8 calculating and displaying an indication of a location of a performer representation on the stage. FIG. 9A depicts the user interface 800 at multiple points in time as the Juliet representation 806 is moved from a first location at "0" along the numberline 420 to a second location at "18" along the numberline 420. FIG. 9A illustrates the path of the movement. When the Juliet representation 806 is moved to a position "4" along the numberline 420, the position indicator 810 may automatically update to display "4." Similarly, when the Juliet representation 806 is moved to a location "8," a location "11," and a location "15," along the numberline 420, the position indicator 810 may automatically update to display "8," "11," and "15," respectively. When the Juliet representation is finally positioned at a position "18" along the numberline 420, the position indicator 810 may again update to display "18."

FIG. 9B depicts the user interface 800 at the point in time when the Juliet representation 806 is finally positioned at the second location at "18" left of stage along the numberline 420. The position indicator 810 displays "18" to indicate the location of the Juliet representation 806, for quick and easy identification by a user. The spacing chart 134 in FIG. 9B also displays a pathway 902, which may convey movement during the time period corresponding the spacing chart 134. In particular, the pathway 902 may indicate movement (e.g., the path) of Juliet, the performer, during the time period corresponding to the spacing chart 134. If, for example, the spacing chart 134 corresponds to a time period of choreography that is eight counts long, the pathway 902 indicates that Juliet moves from the first location at "0" along the numberline 420 to the second location at "18" left of center along the numberline 420 during the eight counts of the time period.

A pathway 902 may be associated with a variety of elements of a spacing chart 134, including but not limited to set piece representations 142 and performer representations 140. The pathway 902 may be inserted into a chart by a user or the pathway 902 may be automatically generated from a first location of a representation (e.g., a performer representation 140 or a set piece representation 142) to a second location. For example, the first location may be determined based on a location of a representation in a spacing chart that corresponds to a time period immediately prior to the time period of the currently displayed spacing chart 134. The chart editor 118 may include a duplicate button 904 or similar input component that, when operated, causes the chart editor 118 to create a new spacing chart that is a duplicate of the currently displayed spacing chart 134. As an optional default, the new duplicate spacing chart may be associated with a time period immediately following the time period corresponding to the currently displayed spacing chart 134. When a representation is moved in the new spacing chart, a pathway 902 may be automatically generated by the chart editor 118 between the starting location and the new location of the representation.

The position indicator 810 of FIGS. 8, 9A, and 9B, displays a single numeric value representative of horizontal location along the numberline 420. The position indicator 810 illustrated is one dimensional (i.e., width along the stage). However, the position indicator 810 may display an indicator of position in two dimensions (e.g., width and depth) or three dimensions (e.g., width, depth, and height).

FIG. 10 is a graphical depiction of the user interface 800 receiving input to insert a set piece representation 142 into a spacing chart 134. The chart editor 118 of the user interface 800 receives input specifying a particular set piece representation 142 to add to the current spacing chart 134. A menu option of one or more of the menus (e.g., the insert menu) may launch "the wings" 1002 that displays a list 1004 of set pieces for which set piece representations 142 are available to be added to the current spacing chart 134. Selection of a particular set piece, such as a couch, from the wings may result in a couch representation 1006 being inserted into the current spacing chart 134. As described above, movement of the set piece during the time period of the current spacing chart 134 can be shown by a pathway (not shown).

Figure 11:
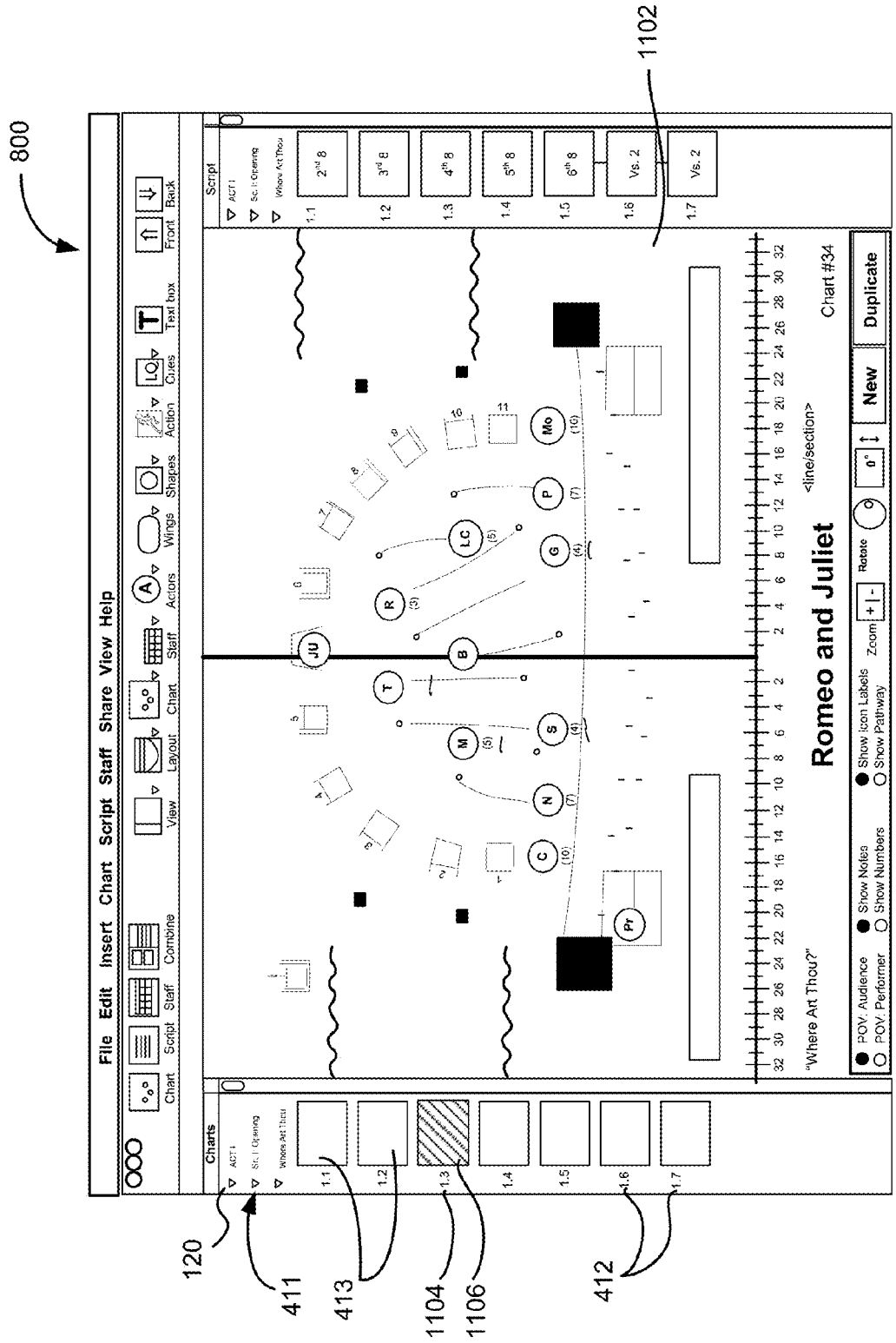
FIG. 11 is a graphical depiction of a user interface displaying a spacing chart that is selected from a queue of spacing charts, according to one embodiment.

FIG. 11 is a graphical depiction of the user interface 800 displaying a particular completed spacing chart 1102. The spacing chart 1102 shown may have been selected from the chart queue 120. As described above, the chart queue 120 may present a navigable structure, such as an expandable chart tree 411 that includes descriptors 412 and/or chart representations 413 to represent time periods in the choreography. Selection of a descriptor 412 and/or chart representation 413 from the expandable chart tree 411 may result in a corresponding spacing chart 134, such as the particular spacing chart 1102, being displayed in the chart editor 118. In FIG. 11, the descriptor "1.3" 1104 and/or the chart representation 1106, which correspond to spacing chart 1102, are shown highlighted as having been selected. Thus, spacing chart 1102 is being displayed. Selection of a different descriptor 412 and/or chart representation 413 from the expandable tree 411 of the chart queue 120 may cause the corresponding spacing chart 134 to be displayed in the chart editor 118.

Figure 12:
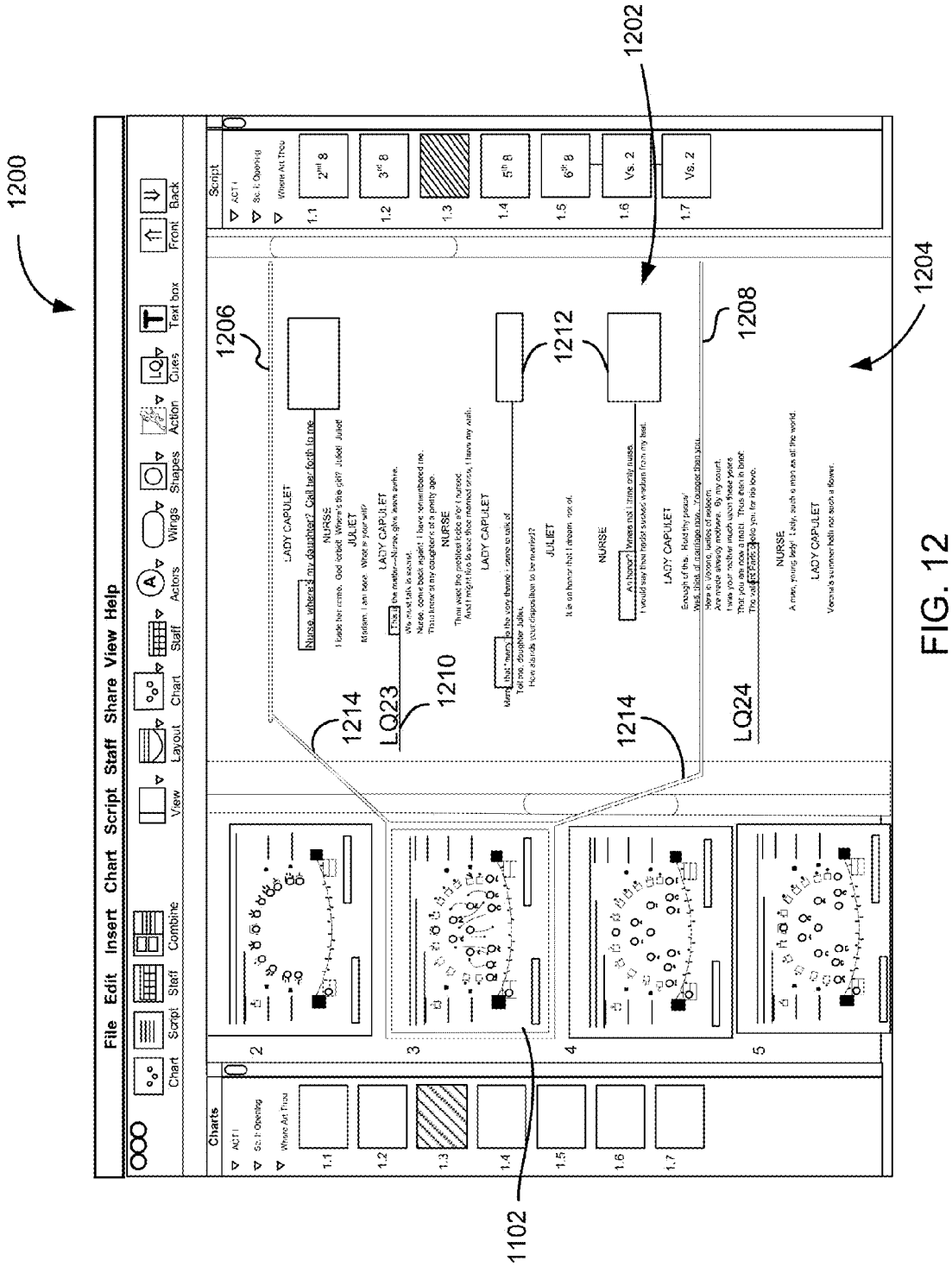
FIG. 12 is a graphical depiction of a user interface displaying a spacing chart associated with a section of a script, according to one embodiment.

FIG. 12 is a graphical depiction of a user interface 1200 of a system for managing choreography. The user interface 1200 includes a chart editor 118 and a script editor 124 displaying a combined view. The combined view shows a spacing chart 1102 associated with a section 1202 of a script 1204 of the choreography. The spacing chart 1102 and the section 1202 of script are shown simultaneously, side-by-side. The script 1204 may be displayed in an uneditable format, such as in portable document format (pdf) document. The user interface 1200 enables insertion and/or attachment of elements to the script 1204, including section breaks 1206, 1208, cues 1210, and actions 1212. A first section break 1206 or other marker indicates a beginning of the section of script 1202 and a second section break 1208 or other marker indicates an ending of the section of script 1204. Attachment arms 1214 or another type of marker may be provided to show the association between the spacing chart 1102 and the section of script 1202.

A cue 1210 may be inserted into the script 1204 to prompt a staging action. For example, a cue 1210 may be a lighting cue (indicating the point in time and/or location where the lights would shift) or a cue to move the scenery and/or one or more set pieces. For example, a code 'LQ23' (lighting cue 23) may be inserted on a particular line of the script 1204.

An action 1212 may be a text box that visually connects to a word or phrase in the script 1204. The action 1212 may describe movement(s) or other actions of a performer during the associated word and/or phrase. Action boxes are an alternative form of choreography documentation that can be used in place of or combined with staging staffs 136, which are described below. Typically, a user would use one of either actions 1212 in a script view or staging staffs 136. However, in one embodiment of the present disclosure, text inserted into either of an action 1220 or a staging staff 136 results in auto-population of the other at the appropriate location in the script 1204, thereby facilitating use of both actions 1220 and staging staffs 136.

Figures 13A, 13B:
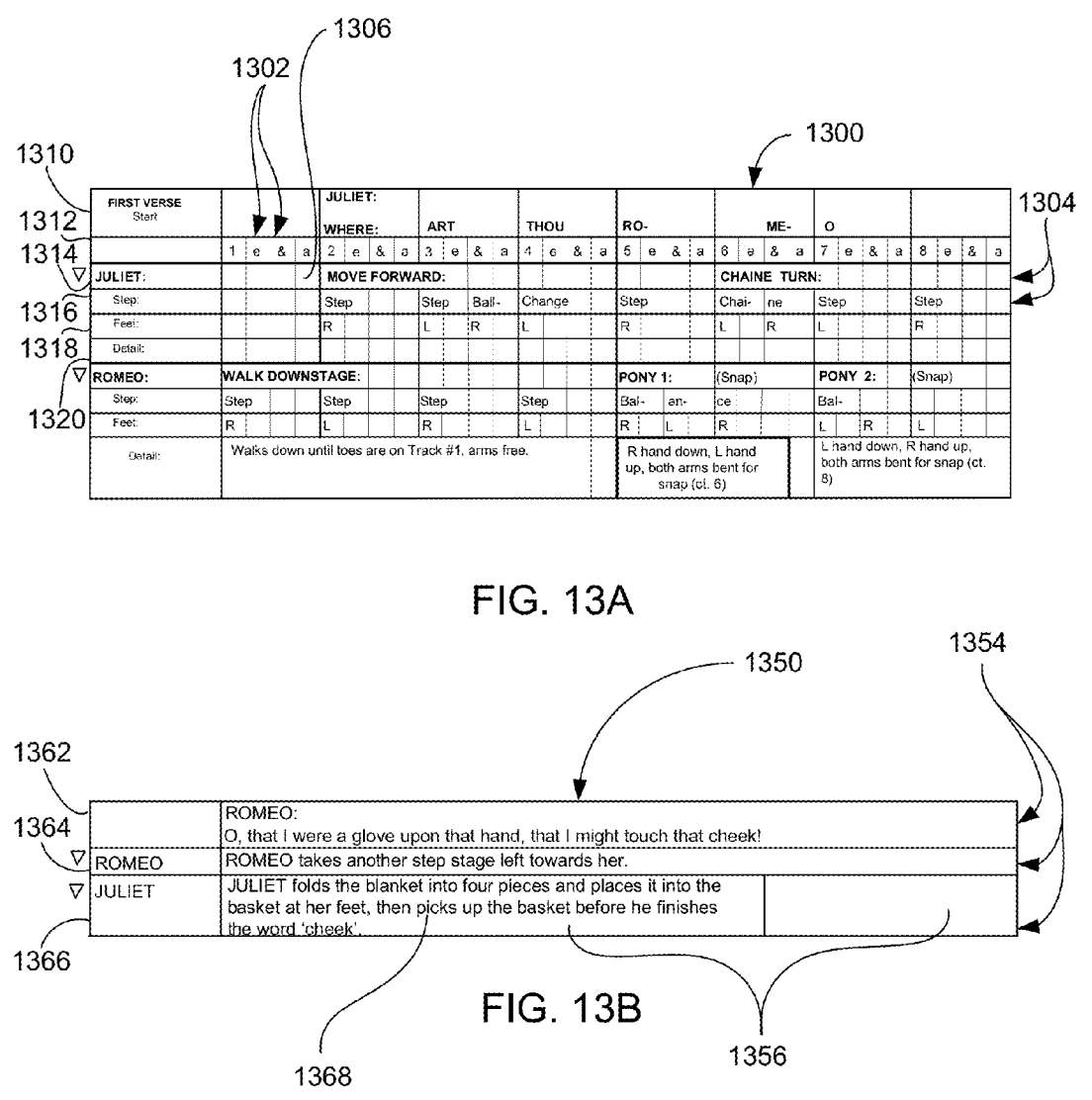

FIGS. 13A and 13B are sample embodiments of staging staffs 136 for documenting choreography, according to the present disclosure. FIG. 13A is a staging staff 1300 for documenting choreography. The staging staff 1300 may comprise a series of columns 1302 and rows 1304 forming cells 1306 in a grid-like configuration. The grid-like configuration of the staging staff 1300 enables documentation of movement in choreography in a manner that is coordinated to the timing or flow of the choreography and may be particularly appropriate for documenting choreography set to music. The columns 1302 may represent counts and/or sub-counts. The rows 1304 may provide performer-specific information for actions occurring during one or more counts and/or sub-counts. In other words, a cell 1306 (i.e., an intersection of a column 1302 and a row 1304) can contain information concerning a performer's action during a count and/or sub-count. The columns 1302 break the rows 1304 into counts and/or sub-counts. The information of a performer's action within a cell 1306 can include as much detail as desired while simultaneously documenting how the movement coordinates to other performers and the timing or flow of the choreography, such as a beat of the music or a time line of a dialogue. A cell 1306 may include text (e.g., codes, instructions, prose, and the like)

describing movement of a performer at a point in time (on a count or sub-count). As will be explained, cells 1306 in the same row may be combined to document performer movements occurring during the span of multiple counts and/or sub-counts.

A first row 1310 of the staging staff 1300 may be a lyric or dialogue line to present one or more lines from the script (e.g. words of a dialog, lyrics of a musical number) for the time period with which the staging staff 1300 corresponds. A line from the script may be separated, with portions in different columns 1302, according to a desired beat and/or flow. Multiple lyric or dialogue lines can be added for situations when there are overlapping dialogue or lyrics, to portray how the voices work together.

A second row 1312 may be a countline to provide an indication in each column of the count and/or sub-count represented by the column. In the illustrated embodiment, each column 1302 represents a sub-count, with four sub-counts per count. Thus, the countline is labeled 1, e, &, a, 2, e, &, a, 3, etc.

Additional rows provide details of specific performers. Each performer for which movements are documented in the staging staff 1300 may be associated with one or more rows 1304. For example, in the illustrated embodiment, each performer is associated with four rows: a general performer row 1314, a step row 1316, a feet row 1318, and a detail row 1320. Because the four performer rows 1314, 1316, 1318, 1320 align with a sub-count in the countline 1312, a viewer can see at a glance what every performer is doing on any sub-count. Other types of rows are possible (e.g., an arms row, a head row).

The general performer row 1314 allows space to provide a common name or name of the section of movement, for easy reference. The step row 1316 and feet row 1318 are useful for documenting the movement of the feet of the performer. The step row 1316 is used to indicate a breakdown of the step. The name of the step (e.g., step, balance, ball-change, cross, close, chaîné turn) may be matched with exactly the count(s) on which the step takes place. If the step involves multiple separate moves, the common name can be provided in the general performer row 1314 and then the multiple separate moves can be broken down in the step row 1316. For example, a 'chaîné turn' actually comprises three separate steps, so this move could be documented in three syllables on the 'step row' that each align with the appropriate count (e.g., 'chai-' on count 6, 'né' count 6&, and 'step' on count 7).

The feet row 1318 indicates on which foot the step is made (e.g. L for left or R for right). An easy to understand vocabulary may be used to document the footwork and direction for any step. For example, the following code vocabulary may be used:

| | |
|---|---|
| L | Left |
| LF | Left Forward |
| LB | Left Backward |
| LS | Left Side |
| LXF | Left Crosses Front of Right |
| LXB | Left Crosses Behind Right |
| R | Right |
| RF | Right Forward |
| RB | Right Backward |
| RS | Right Side |
| RXF | Right Crosses Front of Left |
| RXB | Right Crosses Behind Left |

The detail row 1320 allows a user to enter details of the movement, including arm motion, travel, etc. Any amount of detail can be entered about what is happening on a count or series of counts (e.g., arm movement, traveling direction, body facing, holding something in hand, etc.) The detail row 1320 allows a user to enter this detail information and decide where they want it to appear. For example, a user can customize the detail row 1320 to allow detail information to fill a varying number of counts and/or sub-counts (e.g., counts 2-4&). In other words, the user can choose where in the time line (or on which counts) the detail information appears. Stated differently, cells 1306 in the detail row 1320 can be merged and/or divided to extend across multiple columns and/or portions of a column.

FIG. 13B is another embodiment of a staging staff 1350 for documenting choreography. The staging staff 1350 may be used to document choreography accompanying a dialogue.

The staging staff 1350 may comprise a series of rows 1354 coordinated to the timing or flow of the choreography. The rows 1354 may provide performer-specific information for actions occurring during, for example, a dialogue in the choreography. The information of a performer's actions can be detailed within a cell 1356 of a row 1354 and can include as much detail as desired while simultaneously documenting how the movement coordinates with other performers and the timing or flow of the dialogue. A cell 1356 may include text (e.g., codes, instructions, prose, and the like) describing movement of a performer at a point in time (on a count or sub-count). A first row 1362 of the staging staff 1350 may be a dialogue row to present one or more lines from the script (e.g., words of a dialog) for the time period with which the staging staff 1350 corresponds. A second row 1364 of the staging staff 1350 may be a performer row. Any amount of detail about what is happening can be entered into a performer row 1364, and a user can customize where the details appear along the timeline or relative to the words of a dialogue. For example, a user can customize the performer row 1364 to allow detailed information to begin at any word of a dialogue in the dialogue row 1362 and span any number of words in the dialogue row. As shown in FIG. 13B, the performer row 1366 for Juliet includes a cell 1368 that ends at the word cheek in the dialogue to illustrate how Juliet's action/movement corresponds to the dialogue and when the action/movement should be completed.

FIG. 14 is a graphical depiction of a user interface 1400 of a system for managing choreography displaying a blank staging staff 136. The user interface 1400 may be a user interface of a staff editor 122. The staff editor 122 may generate a staging staff 136, such as the staging staffs depicted in FIGS. 13A-13B, that allows documentation of movement of performers in choreography. The staff editor 122 also enables creation and/or editing of the staging staff 136.

The staff editor 122 may enable selection of a duration of the time period of choreography that is associated with the staging staff 136. A staging staff 136 corresponds to a time period of choreography, for example eight counts, nine counts, ten counts, and the like. A time period duration tool 1302 may be provided to enable a user to select a desired time period duration for the staging staff 136. Buttons 1404 may enable a user to create or define new durations, remove durations, and reorder the listing of durations. The staff editor 122 may receive input designating the duration of the time period and generate or modify the staging staff 136 to have the selected duration and appropriately divide the staging staff 136 into counts and sub-counts. For example, the illustrated staging staff 136 has eight counts and each count is divided into four sub-counts (e.g., 1, e, &, a, 2, e, &, a, 3, etc.). Each sub-count corresponds to a column 1302 (see FIG. 13A) in the staging staff 136.

The staff editor 122 may also enable selection of the number (or quantity) and/or type of rows 1304 to include in connection with each performer. A row selection tool 1406 may enable one or more rows 1304 to be associated with a performer. For example, in the illustrated embodiment, associated with each performer are a general performer row 1314, a step row 1316, a feet row 1318, and a detail row 1320. As mentioned, other rows are possible. The row selection tool 1406 may enable creation of new row types. A skilled artisan will recognize that other tools and options may be available, including a font selection tool, a fill selection tool, and the like.

The staff editor 122 may also receive input to associate the staging staff with a time period within the choreography. The input may include input provided by a user to designate a section of a script. The staff editor 122 may auto-check that the designated time period of choreography has a duration that matches the selected duration of the created or edited staging staff 136.

FIG. 15 is a graphical depiction of a user interface 1500 of a system for managing choreography displaying a staging staff 1502 for a given time period of choreography. The user interface 1500 may include another embodiment of a staff editor 122 to display the staging staff 1502. The staging staff 1502 may be edited as described above with reference to FIG. 14.

As described, the staff queue 144 may order a plurality of staging staffs 136, based on their respective time periods. The chart queue 120 may also provide for user navigation of the staging staffs 136, from a current staging staff 1502 to another of the plurality of staging staffs 136. For example, the staff queue 144 of the depicted embodiment presents an expandable staff tree 1511 that collapses larger time periods of choreography (e.g., a scene or act of a theatrical performance) down to a descriptor 1512 or simple brief description (e.g., "Act 1") and that also expands to display sub-descriptors, which are descriptors of smaller time periods within a larger time period of choreography. A user may click on a descriptor 1512 in the staff tree 1511 (or an input component positioned adjacent thereto) to collapse or expand any sub-descriptors associated with a time period represented by that descriptor 1512. In the illustrated embodiment, the smallest time period represented in the expandable staff tree 1511 corresponds to the time period of a staging staff 136. Each of the plurality of staging staffs 136 is represented by both a descriptor 1512 and a staff representation 1513, such as a thumbnail, icon, and the like, to prompt a user of the content in the corresponding staging staff. Selection of the descriptor 1512 or staff representation 1513 may cause the corresponding staging staffs 136 to be displayed by the staff editor 122.

Figure 16:
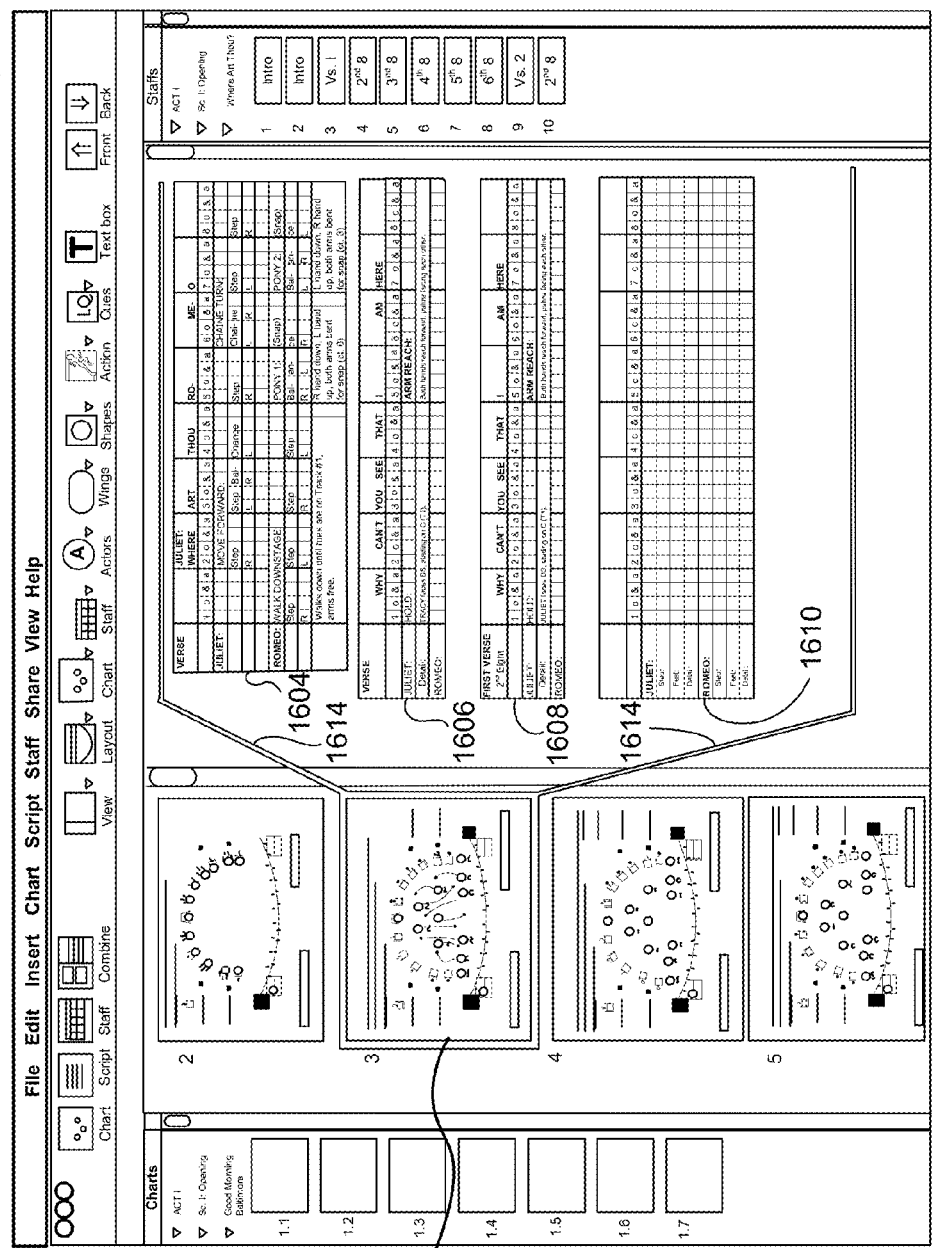
FIG. 16 is a graphical depiction of a user interface displaying a spacing chart in association with staging staffs, according to one embodiment.

FIG. 16 is a graphical depiction of a user interface 1600 of a system for managing choreography. The user interface 1600 includes a chart editor 118 and a staff editor 122 displaying a combined view. The combined view displays a spacing chart 1602 (or multiple spacing charts 134) associated with various staging staffs 1604, 1606, 1608, 1610. The spacing chart 1602 and the staging staffs 1604, 1606, 1608, 1610 are shown simultaneously, side-by-side. Attachment arms 1614 or another type of marker may be provided to show the association between the spacing chart 1602 and the staging staffs 1604, 1606, 1608, 1610.

Figure 17:
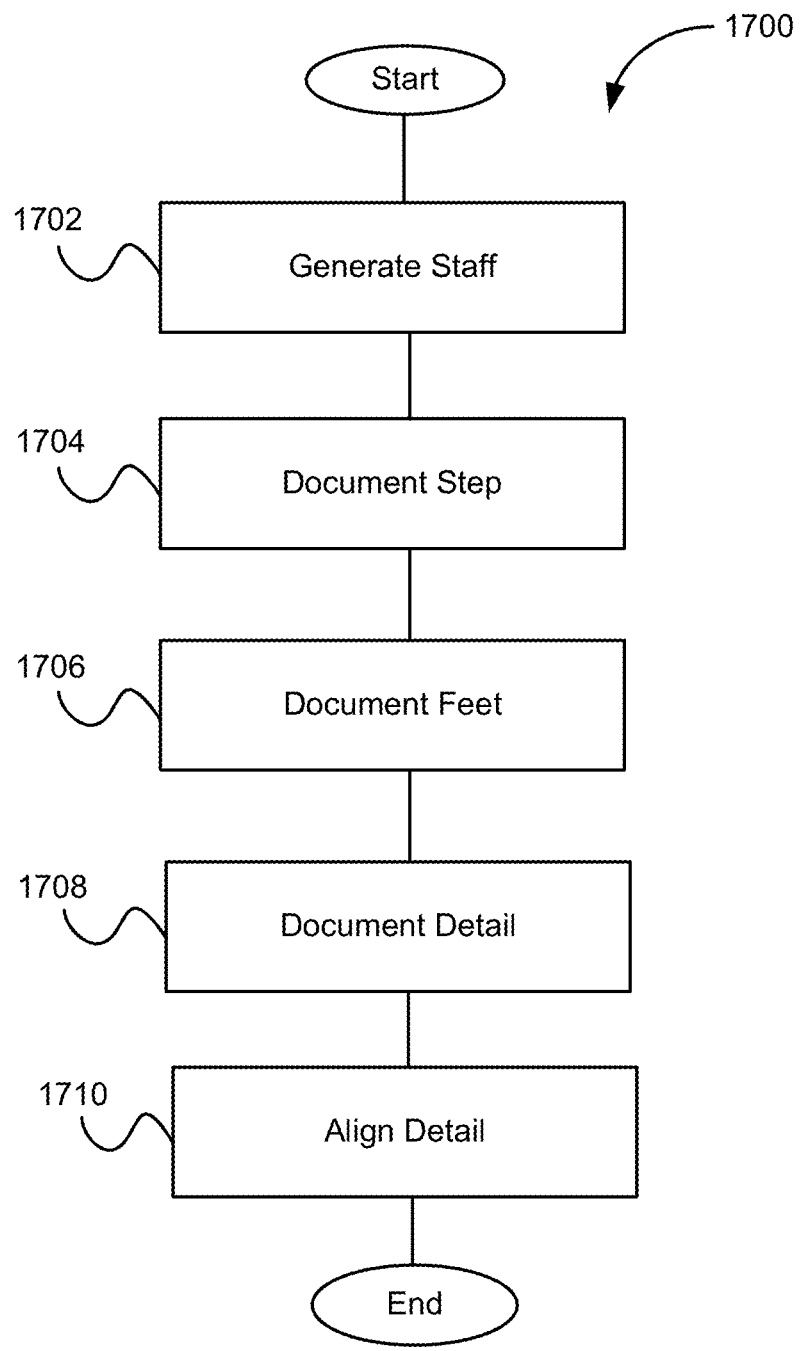
FIG. 17 is a method of documenting choreography using staging staffs, according to one embodiment.

FIG. 17 is another method 1700 of documenting choreography using staging staffs 136, according to one embodiment. A staff editor 122 may generate 1702 a staging staff 136. The staging staff 136 may be generated based on inputs received, for example, through user interaction with a user interface of the staff editor 122 or through uploading from an input file. The staff editor 122 may receive input for documenting 1704 a step of a performer and for documenting 1706 the feet (e.g., the footwork) of the step. The staff editor 122 may also receive input for documenting 1708 additional details of a performer's movements. The details may be aligned 1710 (e.g., the cell of the staging staff may be adjusted in size and/or position horizontally) to the appropriate words of a line of dialogue or lyrics of a song.

This disclosure has been made with reference to various exemplary embodiments including the best mode. However, those skilled in the art will recognize that changes and modifications may be made to the exemplary embodiments without departing from the scope of the present disclosure. For example, various operational steps, as well as components for carrying out operational steps, may be implemented in alternate ways depending upon the particular application or in consideration of any number of cost functions associated with the operation of the system, e.g., one or more of the steps may be deleted, modified, or combined with other steps.

Additionally, as will be appreciated by one of ordinary skill in the art, principles of the present disclosure may be reflected in a computer program product on a computer-readable storage medium having computer-readable program code means embodied in the storage medium. Any suitable tangible, non-transitory computer-readable storage medium may be utilized, including magnetic storage devices (hard disks, floppy disks, and the like), optical storage devices (CD-ROMs, DVDs, Blu-Ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing the functions specified. These computer program instructions may also be stored in a computer-readable memory that can direct a computer or other programmable data processing apparatus to function in a particular manner, such that the instructions stored in the computer-readable memory produce an article of manufacture including implementing means which implement the function specified. The computer program instructions may also be loaded onto a computer or other programmable data processing apparatus to cause a series of operational steps to be performed on the computer or other programmable apparatus to produce a computer-implemented process, such that the instructions which execute on the computer or other programmable apparatus provide steps for implementing the functions specified.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure.

The foregoing specification has been described with reference to various embodiments. However, one of ordinary skill in the art appreciates that various modifications and changes can be made without departing from the scope of the present disclosure. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, system, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection.

Those having skill in the art will appreciate that many changes may be made to the details of the above-described embodiments without departing from the underlying principles of the invention. The scope of the present invention should, therefore, be determined only by the following claims.

The invention claimed is:

1. A computer-implemented method for managing movements of stage elements within a stage play, the method comprising:

receiving, on a computing device, input specifying one or more stage dimensions, including a width dimension;

generating automatically, on the computing device, a stage layout of a stage having the specified one or more dimensions, including the width dimension, the stage layout including a customizable-unit numberline that designates a stage centerline and locations along the width of the stage in terms of a unit distance from the centerline;

receiving, on the computing device, input specifying at least two stage elements;

creating, on the computing device, a plurality of charts documenting a first set of positions of a first stage element of the at least two stage elements and a second set of positions of a second stage element of the at least two stage elements on the stage at a plurality of time periods in a staging of the at least two stage elements, each of the plurality of charts associated with a corresponding time period and including the stage layout and representations of the at least two stage elements each at a position on the stage during the corresponding time period, wherein the positions of the representations of the at least two stage elements are associated with the numberline;

generation a first staging staff section comprising a first plurality of rows, each row representing at least an aspect of the first stage element of the at least two stage elements at a plurality of counts or sub-counts;

generating a second staging staff section comprising a second plurality of rows, each row representing at least an aspect of the second stage element of the at least two stage elements at the plurality of counts or sub-counts, wherein the first staging staff section and the second staging staff section are distinct from and do not overlap each other; and ordering, on the computing device, the plurality of charts according to their respective time periods.

2. The computer-implemented method of claim 1, wherein the creating further comprises:

applying the stage layout to the chart on the computing device;

associating the chart with a given section of script in the stage play;

displaying on an output device of the computing device the chart, including a representation of the stage;

receiving input on the computing device designating the position of a stage element of the at least two stage elements on the stage during the given time period;

displaying the representation of the stage element on the stage at the position; and storing the chart, including the stage layout, the representation of the stage element, and the position of the representation of the stage element.

3. The computer-implemented method of claim 2, wherein the creating further comprises displaying automatically, in the chart and adjacent the display of the representation of the stage element, a numeric indication of the unit distance of the stage element from the centerline along the customizable-unit numberline at the position designated by the received input.

4. The computer-implemented method of claim 1, further comprising creating, on the computing device, a scene layout for a scene of the stage play, the scene including one or more time periods of the stage play, the scene layout diagramming a change in position on the stage of a set piece during the one or more time periods of the scene.

5. The computer-implemented method of claim 1, wherein the customizable-unit numberline of the stage layout further comprises a grid and designates locations along a depth of the stage.

6. The computer-implemented method of claim 1, wherein the corresponding time period of a chart is determined based on receiving input designating one or more staging staffs, and wherein the chart is associated with the designated staging staffs.

7. The computer-implemented method of claim 6, wherein a staging staff of the one or more staging staffs comprises a plurality of columns and a plurality of rows that form cells in a grid-like configuration, each of the columns representing a count or sub-count, each row representing at least an aspect of one of a plurality of stage elements.

8. The computer-implemented method of claim 7, wherein the plurality of rows of a staging staff include:

a lyric row to present one or more lines from the script for a time period with which the staging staff corresponds;

a countline that provides an indication in each column of the count and/or sub-count represented by the column;

a step row indicating a breakdown of a step of the stage element, broken apart in the columns to match counts on which the step is made, when the stage element is a performer;

a feet row indicating which foot performs which portion of the step of the stage element; and a detail row providing additional details of movement of the stage element.

9. The computer-implemented method of claim 1, wherein the stage element is a set piece.

10. The computer-implemented method of claim 1, further comprising selecting a unit width for the customizable-numberline.

11. The computer-implemented method of claim 1, further comprising generating a staging staff for the at least two stage elements comprising a plurality of rows, wherein progression within the staging staff from left to right represents a series of chronological actions within the stage play;

wherein alignment within a vertical space within the staging staff represents an alignment with a chronological action in the stage play; and wherein each row represents at least an aspect of the at least two stage elements.

12. A computing device for managing a stage play, the computing device comprising:

an input device to receive user input specifying one or more stage dimensions, including a width dimension, and user input specifying performer positions of at least two performers on the stage;

a display to present charts documenting the stage play;

a stage editor to automatically generate a stage layout of a stage having the specified one or more stage dimensions, including the width dimension, the stage layout including a customizable-unit numberline that designates a stage centerline and locations along the width of the stage in terms of a distance from the centerline;

a chart editor to:
  create charts documenting a first set of performer positions of a first performer of the at least two performers and a second set of performer positions of a second performer of the at least two performers on the stage at a plurality of cues in the stage play, the chart editor comprising a user interface to present on the display a current chart and to receive user-input specifying a performer position for each of the at least two performers and a corresponding cue of the current chart, each chart including the stage layout and representations of the at least two performers positioned on the stage during the corresponding cue of the chart;
  generate a first staging staff section comprising a first plurality of rows, each row representing at least an aspect of the first performer of the at least two performers at a plurality of counts or sub-counts;
  generate a second staging staff section comprising a second plurality of rows, each row representing at least an aspect of the second performer of the at least two performers at the plurality of counts or sub-counts, wherein the first staging staff section and the second staging staff section are distinct from and do not overlap each other; and a chart queue component to order the plurality of charts in sequence according to their respective cues.

13. The computing device for managing stage play of claim 12, wherein the chart editor is further configured to:
  apply a stage layout to the chart;
  associate the chart with a given cue in the stage play;
  present on the display of the computing device a presently selected chart, including a representation of the stage;
  receive input designating the position of a performer of the at least two performers on the stage during the cue;
  display the representation of the performer on the stage at the position; and
  store the chart, including the stage layout, the representation of the performer, and the position of the representation of the performer.

14. The computing device for managing stage play of claim 13, wherein the chart editor is further configured to display on the chart a numeric indication of the distance of the performer from the centerline along the numberline at the position designated by the received input.

15. The computing device for managing stage play of claim 12, further comprising a scene editor configured to create a scene layout for a scene of the stage play, the scene including one or more cues of the stage play, the scene layout diagramming a position on the stage of a set piece during the one or more cues of the scene, wherein each of the plurality of charts that corresponds to a cue of the scene further includes the scene layout.

16. The computing device for managing stage play of claim 12, further comprising:
  a staff editor to create staging staffs documenting performer movements at a plurality of cues in the stage play, the staff editor comprising a user interface to present on the display a current staff and to receive user-input specifying performer movements and a corresponding cue of the current staging staff, each staging staff comprising a plurality of columns and a plurality of rows that form cells in a grid-like configuration with each of the columns representing a count or sub-count of the corresponding cue.

17. A system for managing a stage play, the system comprising:
  a processor;
  a memory in electrical communication with the processor, the memory having stored thereon instructions that, when executed by the processor, cause the processor to perform operations comprising:
    receiving, on a computing device, input specifying one or more stage dimensions, including a width dimension;
    generating automatically, on the computing device, a stage layout of a stage having the specified one or more dimensions, including the width dimension, the stage layout including a numberline that designates a stage centerline and customizable-unit locations along the width of the stage in terms of a distance from the centerline;
    receiving, on the computing device, input specifying at least two performers;
    creating, on the computing device, a plurality of charts documenting a first set of positions of a first performer of the at least two performers and a second set of positions of a second performer of the at least two performers on the stage at a plurality of time periods in the stage play, each of the plurality of charts associated with a corresponding time period and including the stage layout and representations of the at least two performers each at a position on the stage during the corresponding time period, wherein the positions of the representations of the at least two performers are associated with the numberline;
    generating a first staging staff section comprising a first plurality of rows, each row representing at least an aspect of the first performer of the at least two performers at a plurality of counts or sub-counts;
    generating a second staging staff section comprising, a second plurality of rows, each row representing at least an aspect of the second performer of the at least two performers at the plurality of counts or sub-counts, wherein the first staging staff section and the second staging staff section are distinct from and do not overlap each other; and
    ordering, on the computing device, the plurality of charts according to their respective dialogue.

18. The system for managing stage play of claim 17, wherein the creating of each of the plurality of charts further comprises:
  applying the stage layout to the chart on the computing device;
  associating the chart with a given dialogue in the stage play;
  displaying on an output device of the computing device the chart, including a representation of the stage;
  receiving input on the computing device designating the position of a performer of the at least two performers on the stage during the given dialogue;
  displaying the representation of the performer on the stage at the position; and storing the chart, including the stage layout, the representation of the performer, and the position of the representation of the performer.

19. The system for managing stage play of claim 18, wherein the creating of each of the plurality of charts further comprises displaying automatically, in the chart and adjacent the display of the representation of the performer, a numeric indication of the distance of the performer from the centerline along the numberline at the position designated by the received input.

20. The system for managing stage play of claim 17, further comprising instructions that, if executed by the processor, cause the processor to perform operations comprising:
   creating a scene layout for a scene of the stage play, the scene including one or more dialogues of the stage play, the scene layout diagramming a position on the stage of a set piece during the one or more dialogues of the scene, wherein each of the plurality of charts that corresponds to a dialogue of the scene further includes the scene layout.

21. The system for managing stage play of claim 17, further comprising instructions that, if executed by the processor, cause the processor to perform operations comprising:
   creating a plurality of staging staffs documenting movements of a performer of the at least two performers in the stage play at a plurality of dialogues in the stage play, each of the plurality of staging staffs associated with a corresponding dialogue of the plurality of dialogues and having a plurality of columns and a plurality of rows that form cells in a grid-like configuration, each of the columns representing a count or sub-count of the corresponding dialogue.

22. The system for managing stage play of claim 21, wherein the plurality of rows of a staging staff include:
   a lyric row to present one or more lines from the script for a dialogue with which the staging staff corresponds;
   a count line that provides an indication in each column of the count and/or sub-count represented by the column;
   a step row indicating a breakdown of a step of the performer, broken apart in the columns to match counts on which the step is made;
   a feet row indicating which foot performs which portion of the step of the performer; and
   a detail row providing additional details of the movement.

23. A non-transitory computer-readable storage medium having stored thereon instructions that, if executed by a computer, cause the computer to perform operations to document stage play, the operations comprising:
   receiving, on a computing device, input specifying one or more stage dimensions, including a width dimension;
   generating automatically, on the computing device, a stage layout of a stage having the specified one or more dimensions, including the width dimension, the stage layout including a numberline that designates a stage centerline and locations along the width of the stage in terms of a customizable-unit distance from the centerline;
   receiving, on the computing device, input specifying at least two performers;
   creating, on the computing device, a plurality of charts documenting a first set of positions of a first performer of the at least two performers and a second set of positions of a second performer of the at least two performers on the stage at a plurality of time periods in the stage play, each of the plurality of charts associated with a corresponding time period and including the stage layout and representations of the at least two performers each at a position on the stage during the corresponding time period, wherein the positions of the representations of the at least two performers are associated with the numberline;
   generation a first staging staff section comprising a first plurality of rows, each row representing at least an aspect of the first performer of the at least two performers at a plurality of counts or sub-counts;
   generating a second staging staff section comprising a second plurality of rows, each row representing at least an aspect of the second performer of the at least two performers at the plurality of counts or sub-counts, wherein the first staging staff section and the second staging staff section are distinct from and do not overlap each other; and
   ordering, on the computing device, the plurality of charts according to their respective time periods.

* * * * *